United States Patent [19]

Sato et al.

[11] Patent Number: 5,725,968
[45] Date of Patent: Mar. 10, 1998

[54] ALKALINE ION-ABSORBING/DESORBING CARBON MATERIAL ELECTRODE MATERIAL FOR SECONDARY BATTERY USING THE CARBON MATERIAL AND LITHIUM SECONDARY BATTERY USING THE ELECTRON MATERIAL

[75] Inventors: Kenji Sato; Atsushi Demachi; Minoru Noguchi; Naohiko Oki; Kazuhiro Araki, all of Wako; Morinobu Endo, Suzaka, all of Japan

[73] Assignee: Honda Giken Kogyo Kabushiki Kaisha, Tokyo, Japan

[21] Appl. No.: 590,874

[22] Filed: Jan. 24, 1996

Related U.S. Application Data

[63] Continuation of Ser. No. 160,793, Dec. 3, 1993, abandoned.

[30] Foreign Application Priority Data

| Dec. 7, 1992 | [JP] | Japan | 4-351047 |
| May 31, 1993 | [JP] | Japan | 5-149759 |
| Jul. 24, 1993 | [JP] | Japan | 5-202860 |
| Oct. 13, 1993 | [JP] | Japan | 5-278884 |

[51] Int. Cl.[6] .................................................. H01M 4/02
[52] U.S. Cl. ................................................................. 429/218
[58] Field of Search .................................... 429/194, 212, 429/213, 218, 224

[56] References Cited

U.S. PATENT DOCUMENTS

| 4,615,959 | 10/1986 | Hayashi et al. | |
| 4,945,014 | 7/1990 | Miyabayashi et al. | 429/218 |
| 5,162,170 | 11/1992 | Miyabayashi et al. | 429/94 |
| 5,260,148 | 11/1993 | Idota | 429/198 |
| 5,306,582 | 4/1994 | Tanaka | 429/185 |

FOREIGN PATENT DOCUMENTS

| 0165047 | 6/1985 | European Pat. Off. . |
| 0201038 | 4/1986 | European Pat. Off. . |
| 3233861 | 10/1991 | Japan . |

OTHER PUBLICATIONS

Japanese Patent Unexamined Publication No. 3-176963 Jul. 31, 1991.

Japanese Patent Unexamined Publication No. 2-82466 Mar. 23, 1990.

Primary Examiner—M. Nuzzolillo
Attorney, Agent, or Firm—Birch, Stewart, Kolasch & Birch, LLP

[57] ABSTRACT

An alkali ion-absorbing/desorbing carbon material excellent in absorption and desorption of alkali ions and useful for an electrode material for a secondary battery or an anode material of a lithium battery is obtained by heat treatment at 300° to 1000° C. of an organic polymer having an aromatic structure, wherein the monomers of the aromatic organic polymer are linked together by o-bonding or m-bonding, or wherein the aromatic organic polymer has a branched structure or a crosslinked structure. The carbon material has a randomly stacked, condensed aromatic ring structure.

27 Claims, 14 Drawing Sheets

PPP700

Li-GIC/PPP700

$^7$Li-NMR SPECTRUM OF 700 °C HEAT-TREATED PPP CHARGED WITH 1000 Ah/kg (WAVEFORM SEPARATION)

STRUCTURAL REPRESENTATION OF FULLY CHARGED PPP HEAT TREATED AT 700 °C

5,725,968

ALKALINE ION-ABSORBING/DESORBING CARBON MATERIAL ELECTRODE MATERIAL FOR SECONDARY BATTERY USING THE CARBON MATERIAL AND LITHIUM SECONDARY BATTERY USING THE ELECTRON MATERIAL

This application is a continuation of application Ser. No. 08/160,793 filed on Dec. 3, 1993, now abandoned.

BACKGROUND OF THE INVENTION

The present invention relates to an alkaline ion-absorbing/desorbing carbon material, and more particularly to an alkaline ion-absorbing/desorbing carbon material suitable for an electrode material for a nonaqueous electrolyte secondary battery. The present invention also relates to an electrode material for a secondary battery using the carbon material, and to a lithium secondary battery using the electrode material.

In recent years, miniaturization of electronic devices has proceeded, which causes a demand for increased energy density of batteries, and various nonaqueous electrolyte batteries have been proposed.

For example, previously, metallic lithium has been used mainly for primary batteries as anodes for nonaqueous electrolyte batteries, and anodes of lithium alloys represented by aluminum/lithium alloys and carbon anodes have also been known.

However, when used as anodes for secondary batteries, metallic lithium has been known to be inferior in cycle stability due to formation of dendrites, etc.

Further, the anodes of the lithium alloys represented by the aluminum/lithium alloys can not be said to fully take out the performance of the lithium batteries, although an improvement in cycle stability is observed compared with metallic lithium.

For solving such problems, it has also been proposed to use carbon anodes utilizing that carbon intercalation compounds of lithium are electrochemically easily formed.

The conventional carbon materials used for lithium secondary batteries are divided into two classes, graphitizable carbon and non-graphitizable carbon, when classified based on their crystal structure. In this classification, the carbon materials are classified mainly according to the spacing of D(002) and the crystallite size in the directions of the C-axis and a-axis by X-ray diffraction, and the ratio of the intensity of 1580 $cm^{-1}$ band in Raman spectroscopy which corresponds to crystalline graphite to the intensity of 1360 $cm^{-1}$ band in Raman spectroscopy which corresponds to disordered carbon. These two evaluation methods are effective for sufficiently graphitized carbon (heat-treating temperature: 1,500° C. or higher). In many patents hitherto laid open, carbon structures defined by these numerical values are disclosed.

Such carbon anodes include various ones. For example, a carbon material obtained by heat treatment of crystalline cellulose in a stream of a nitrogen gas at 1,800° C. (Japanese Patent Unexamined Publication No. 3-176963), one obtained by graphitization treatment of coal pitch or petroleum pitch under an inert atmosphere at 2,500° C. or more (Japanese Patent Unexamined Publication No. 2-82466) and one proceeding in graphitization treated at a high temperature exceeding 2,000° C. are used, and provide anodes having cycle stability though a reduction in capacity is observed compared with metallic lithium and the lithium alloys. Also for such anodes, however, sufficient cycle stability has not been obtained in charge and discharge at high current density.

Such carbon anodes are sufficiently gentle in reaction with water also in the charged state, namely in the state where lithium is intercalated in carbon, and the formation of dendrites with charge and discharge is also hardly observed. They are therefore excellent. In many cases, however, some kinds of carbons can scarcely be charged and discharged, or extremely low in capacity, compared with the theoretical capacity (assuming that the state of $LiC_6$ is the maximum capacity). Further, even if the initial capacity is relatively large, the capacity is deteriorated by repetition of charge and discharge to sharply lower the capacity. Even in the carbon anodes having relatively large capacity, repetition of charge and discharge at high current density provides rapid deterioration, and the desired performance as secondary batteries can not be obtained. Thus, anodes having the desired performance have not been obtained by using conventional technology.

For example, a feature of graphitizable carbon is that it is excellent in the flatness of discharge potential. However, an increase in discharge current density extremely lowers its capacity (The 15th Shin-denchi Koso-bukai Toronkai, pages 24 to 31). Its use is therefore limited to one requiring relatively low current density such as memory back up.

On the other hand, a feature of slightly graphitizable carbon is that it can be charged and discharged at higher current density than graphitizable carbon, though it is inferior thereto in the flatness of discharge potential. However, it is insufficient for uses requiring a large current flow such as electric vehicles. The reason for this is that the charge and discharge reaction proceeds by the intercalation-deintercalation reaction of lithium ions into hexagonal net faces of carbon. The interlayer permeation and the removal of the lithium ions only proceed from an edge of a crystal (a face perpendicular to the stacking direction of the hexagonal net face). For this reason, a smaller crystal size results in higher reaction rate. Accordingly, for carbon which can be evaluated by X-ray diffraction or laser Raman spectroscopic analysis previously proposed, charge and discharge do not proceed rapidly because of its large crystal size.

Further, the problem arises that the amount of alkali ions absorbed is limited by the stoichiometric ratio of intercalation compounds, making it impossible to increase the capacity. Furthermore, the spacing is increased by about 10% on intercalation and returns to the original size on deintercalation. Consequently, the problem is also encountered that repeated of charge and discharge destroys the carbon structure, resulting in deterioration of cycle stability.

An alkali ion-absorbing/desorbing carbon material has been desired which absorbs alkali ions in large amounts, which is not destroyed in its structure even by repeated of absorbing and desorbing and which is available at a high rate absorbing and desorbing reaction of alkali ions.

SUMMARY OF THE INVENTION

The present invention was made with the background of the conventional technical problems as described above, and it is therefore a primary object of the present invention to provide an excellent alkali ion-absorbing/desorbing carbon material which absorbs alkali ions in large amounts, which has no change in structure of the alkali ion-absorbing/desorbing compound, and which has a high rate of absorbing/desorbing reaction.

Another object of the present invention is to provide an electrode material for a secondary battery having high capacity, excellent cycle stability, and capable of charge and discharge of high output (high current density).

A further object of the present invention is to provide a lithium secondary battery using the above-mentioned electrode material.

In accordance with the present invention, there is provided an alkali ion-absorbing/desorbing carbon material comprising a carbon material obtained by heat treatment of an organic polymer having an aromatic structure containing at least one structure selected from the group consisting of o-bonding, m-bonding, a branching structure and a crosslinking structure.

Further, the present invention provides an electrode material for a secondary battery comprising the above-mentioned alkali ion-absorbing/desorbing carbon material.

Furthermore, according to the present invention, there is provided a lithium secondary battery comprising a carbon electrode as an anode and an electrolyte containing lithium, in which the above-mentioned alkali ion-absorbing/desorbing carbon material is used for the carbon electrode as the anode.

BRIEF DESCRIPTION OF THE DRAWINGS

FIG. 22(A) and 22(B) are schematic structural diagrams showing a crystal of an alkali ion-absorbing/desorbing carbon material, wherein FIG. 22(A) is a plan view and FIG. 22(B) is a cross sectional view.

DESCRIPTION OF THE PREFERRED EMBODIMENTS

Figure 1:
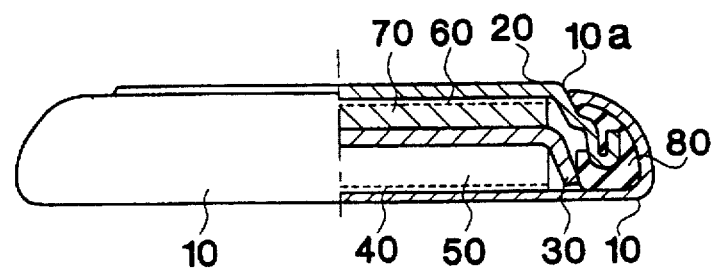
FIG. 1 is a front view partially containing a cross sectional view showing a lithium secondary battery using an alkali ion-absorbing/desorbing carbon material of the present invention as an electrode material.

Carbon has different in properties and crystal structure depending upon the starting material and processing method used to make it, and this results in a great difference in performance in the use thereof as an electrode for a secondary battery also.

In the present invention, an organic polymer having an aromatic structure containing o-bonding, m-bonding, a branching structure or a crosslinking structure, not a linear type polymer, is used as a starting material, and heat treated, for example, at a temperature of 300° to 1,000° C., to obtain an excellent alkali ion-absorbing/desorbing carbon material capable of absorbing and desorbing alkali ions.

In the present invention, the organic polymer comprises at least one structure selected from the group consisting of o-bonding, m-bonding, a branching structure and a crosslinking structure in its repeating units. For example, such an organic polymer containing o-bonding and m-bonding can be obtained by polymerizing 1 to 20 mol % of an o-dihalogenated benzene, an m-dihalogenated benzene or a mixture thereof which contains o-bonding and/or m-bonding and 99 to 80 mol % of p-dihalogenated benzene, using a Grignard reagent in the presence of a nickel(II) catalyst. Further, such a polymer having a branching structure can be obtained by polymerizing 1,2,4-trihalogenated benzene, 1,3,5-trihalogenated benzene or a mixture thereof and p-dihalogenated benzene in a manner similar to that described above.

Besides the above-mentioned method (Yamamoto method), any method may be used as long as the bonding position can be regulated. For example, a dihalogenated benzene or a trihalogenated benzene may be polymerized in the presence of a nickel(0) complex catalyst. Further, the organic polymer having an aromatic structure containing o-bonding, m-bonding, a branching structure or a crosslinking structure can be obtained, for example, by the Kovacic method in which benzene is oxidized by $CuCl_2$ and polymerized in the presence of $AlCl_3$, a Lewis acid catalyst.

The ratio of o-bonding, m-bonding, a branching structure or a crosslinking structure contained in the organic polymer used in the present invention is 1 mol % or more, preferably 1 to 20 mol %, and more preferably 2 to 10 mol %. A ratio of less than 1 mol % results in only an exhibition of characteristics similar to those of poly(p-phenylene).

In the present invention, the heat treatment temperature is usually 300° to 1,000° C., and more preferably 600 ° to 800° C. Carbonization does not proceed at a temperature of less than 300° C., whereas it proceeds too much at a temperature exceeding 1,000° C., resulting in a reduction in capacity as a battery.

The organic polymers are heat treated, preferably in the vicinities of the carbonization temperatures of the organic polymers. The carbonization temperature is a temperature at which elimination of hydrogen, etc., from the organic polymer or the starting material occurs, and measured by TG (thermogravimetry) or DTA (differential thermal analysis). This carbonization temperature varies according to starting materials, and the optimum heat treatment temperature also varies. However, this temperature is preferably within the range of the carbonization temperature to the carbonization temperature +300° C., usually 300° to 1,000° C., and more preferably 600° to 800° C.

The heating time is appropriately 0 to 6 hours, and preferably 0 to 2 hours, wherein the heating time is the time after the arrival of the material at an established temperature, namely the heat treatment temperature. Even if this time is 0, the performance as the electrode is not largely influenced.

As this specific heat-treating method, the temperature may be elevated from room temperature to the weight decrease initiating temperature at any programming rate, and the performance of the carbon materials obtained therefrom as the electrode materials is not influenced. The temperature is preferably raised from the weight decrease initiating temperature to the heat treatment temperature at a constant programming rate, appropriately at 0.1° to 20° C./minute, preferably at 0.5° to 15° C./minute, and more preferably at 1° to 10° C./minute.

Then, the heating is preferably carried out (1) in a neutral atmosphere, (2) in a reducing atmosphere, or (3) in the atmosphere until initiation of significant oxidation and thereafter in a reducing atmosphere, a neutral atmosphere or an oxidizing gas.

(1) The neutral atmospheres include argon, helium and nitrogen.

(2) The reducing atmospheres include a hydrogen atmosphere, an ammonia atmosphere and an ammonia-hydrogen atmosphere, and they are preferred because dangling bonds (unstable carbon bonding sites which are not bonded to other atoms) can be reduced by reductive active hydrogen.

Further, as shown in (3), the heat treatment may be conducted in the atmosphere until initiation of significant oxidation. The temperature at which significant oxidation is initiated varies depending on starting materials, but is usually 200° to 500° C. The heat treatment is therefore preferably carried out in the atmosphere until the temperature is elevated to 200° to 400° C. In this case, the organic polymers must be heat treated in a reducing atmosphere, a neutral atmosphere or an oxidizing gas after the heat treatment in the atmosphere. The oxidizing gases include a mixed gas of $NO/N_2O$ (ratio by volume=1/99-99/1) and a mixed gas of $H_2O/N_2O$ (ratio by volume=1/999-2/8). Such treatment is preferred because it is considered that the organic polymers low in molecular weight can be converted to polymers high in molecular weight through oxygen bonds to reduce evaporation at a temperature lower than the carbonization initiating temperature.

The heat treatment is carried out in the specified gas, except when it is conducted in the atmosphere. This gas may be allowed to flow at a flow rate within the range not affecting the control of the programming rate of heating.

Further, for cooling, the temperature may be returned to room temperature in a specified flow of a gas by furnace cooling. After treatments, such as heat treatment, or surface modification is unnecessary.

The alkali ion-absorbing/desorbing carbon materials of the present invention are obtained by the methods described above, and the carbon materials thus obtained are usually powdery or solid. They can be mechanically pulverized to obtain excellent electrode materials.

The carbon material of the present invention thus obtained has a condensed aromatic ring structure, and is composed of a randomly stacked structure. The term "randomly stacked structure", as used herein, means a structure which is entirely random in the orientation of the planes of a condensed aromatic ring, or has no stacked structure exceeding three layers. Carbon materials having a developed structure, not the randomly stacked structure, are not said to be the alkali ion-absorbing/desorbing carbon materials of the present invention, because alkali ions are intercalated between layers.

For the carbon materials of the present invention, carbon materials having a structure at a precursor stage of graphitization are preferably used. The carbon materials at the precursor stage of graphitization have undeveloped crystals which are small in size, because of their low heat treatment temperature, and are suitable for allowing a large current to flow. As shown in the following examples, some of them show a discharge capacity exceeding the theoretical threshold value $LiC_6$ (372 Ah/kg) of the intercalation reaction. However, though the carbon materials are all at the precursor stage of graphitization, there is a difference in their characteristics. On the other hand, the X-ray diffraction and the laser Raman spectrum can reveal that the graphitization of the carbon materials at the precursor stage of graphitization has not proceeded, however it is difficult to fully analyze their structure. In the present invention, therefore, photographs of lattice images of the carbon materials at the precursor stage of graphitization are taken with a high resolution transmission electron microscope (TEM), and Fractal analysis of various carbon materials is conducted to indicate the complexity of the structure as a Fractal dimension D, thereby analyzing these carbon materials at the precursor stage of graphitization in more detail.

The Fractal theory is described here. That is, when the length of a complicated line is measured, measurement with a short scale gives a longer length than that with a long scale. Conversely, for a smooth line, the change in length thereof scarcely occurs, even if the length of the scale is changed. Namely, the more complicated a line is, the more the length of the line depends on the length of a scale for measuring the length of the line. From this fact, it can be represented by a certain ratio as a measure of the complexity of a line at what ratio the distance between two points is measured as a longer value when a shorter scale is used. This ratio corresponds to the Fractal dimension D, and indicate the complexity of a curved line. The Fractal dimension D of N dimensions is defined by the following equation:

$$D = N + \log E_D / \log (1/r)$$

wherein r represents a measure ratio, and $E_D$ represents an increase in distance when the measure ratio is changed.

In the present invention, when the Fractal dimension is taken as D, carbon materials satisfying preferably $1.7 \leq D < 2.0$, more preferably $1.8 \leq D < 2.0$, are desirably used. In the carbon materials at charged state having a Fractal dimension within this range, Li partly forms covalent Li, so that much more Li can be absorbed, compared with the intercalation reaction.

Such carbon materials can be obtained by heat treatment of organic polymers which are substantially graphitizable materials, into which factors inhibiting stacking are introduced, for example, the organic polymer having an aromatic structure containing at least on structure selected from the group consisting of o-bonding, m-bonding, a branching structure and a crosslinking structure, in addition to p-bonding as described above.

The organic polymers which are substantially graphitizable materials may be any compounds, as long as they have aromatic structures. Examples thereof include poly (phenylene), poly(phenylenevinylene) (PPV), poly (phenylenexylene) (PPX), polystyrene, and novolak resins.

The factors inhibiting stacking structure include the bending structure (o-bonding or m-bonding), the branching structure and the crosslinking structure as described above.

Further, these organic polymers may contain organic polymers having 5-membered or 7-membered rings.

Of these polymers, polymers which are low in crystallinity are preferred, and it is desirable that the half width of a diffraction peak in the vicinity of $2\theta=20°$ in X-ray diffraction is preferably 0.75° or more, and more preferably 0.95° or more.

Furthermore, it is preferred that the organic polymers contain quinoid structures. The inclusion of the quinoid structure can be confirmed by observation of an absorption edge within the range of 600 to 900 nm in a diffuse reflectance spectrum of the powdered organic polymer.

Preferred examples of such organic polymers include poly(phenylene) which is high in the degree of polymerization to some extent. In the present invention, the R value defined by the following equation is applied as a measure of the polymerization degree of poly(phenylene). This R value is preferably 2 or more, and more preferably 2.3 to 20, among others.

$$R=A[\delta(para)]/\{A[\delta(mono1)]+A[\delta(mono2)]\}$$

wherein $A[\delta(para)]$ represents the absorbance of an absorption band of an out-of-plane deformation vibration mode of C—H in the vicinity of 804 cm$^{-1}$ in an infrared absorption spectrum, and $A[\delta(mono1)]$ and $A[\delta(mono2)]$ represent the absorbance of absorption bands of the terminal phenyl groups in the vicinity of 760 cm$^{-1}$ and 690 cm$^{-1}$, respectively.

These organic polymers are heat treated at a temperature of 300° to 1,000° C. which is neither high nor low enough to generate electric conductivity.

It is desirable that such organic polymers do not melt until they reach 700° C. on heat treatment and the yield of the carbon materials which are heat-treated materials is preferably 40% or more, and more preferably 70 to 90% at the heat treatment temperature (preferably about 700° C.). Polymers which melt before they reach 700° C. are undesirable, because they are not branching.

The alkali ion-absorbing/desorbing carbon materials of the present invention are composed of the carbon materials thus obtained. When these materials absorb alkali ions to the amounts of $C_6A$, chemical shifts $\delta$ of NMR spectra are preferably within the range of $-3$ to 10 ppm, and more preferably within the range of $-1$ to 2 ppm. When the alkali element is lithium, an observation nucleus is $^7Li$, and the basis of the chemical shift is a value at the time when the peak of 1 mol of LiCl/liter of aqueous solution is taken as 0. The presence of the chemical shift within this range means that the density of unpaired electrons on alkali ions have become almost 0, which indicates that the alkali ions are absorbed by adsorption, not by intercalation, and that carbon keeps a distance from the alkali ions. The present inventors refer to this as "a spoon compound".

On the other hand, it is reported that the chemical shift of intercalated lithium takes a positive value (for example, Tanaka et al., Collected Summaries of Autumn Meeting of Electrochemical Society, Japan, 1992, page 129). The measurement by the present inventors also proves that the chemical shift of intercalated lithium takes a positive value without exception.

This positive chemical shift is caused by a paramagnetic shift due to a radical of the carbon material. When lithium is absorbed in the carbon material, the carbon material receives an electron to keep electrical neutrality at the same time. Carbon which has received the electron is turned to a radical anion. Accordingly, the carbon material which has absorbed lithium has an unpaired electron, and the chemical shift is generated by an interaction between magnetic moments of the electron and a nucleus. According to the theory, the sign of the chemical shift due to an interaction with an electron spin agrees with the sign of the hyperfine coupling coefficient of the electron with the nucleus. The sign of the hyperfine coupling coefficient of $^7Li$ is positive, and the radical-induced chemical shift becomes positive. The degree of the chemical shift is proportional to the density of unpaired ions on the observation nucleus. The intercalated lithium ions are trapped between graphite layers. When the graphite layers are changed to the radial anions, therefore, the density of unpaired electrons exists on the lithium ions to some extent, which causes the positive chemical shift.

The carbon materials of the present invention can absorb lithium as a covalent lithium molecule $Li_2$. Accordingly, the charge transfer to the carbon materials acting as hosts is not accompanied. When the carbon materials absorb lithium by the use of the prior-art intercalation reaction, lithium is absorbed as a cation. The negative charge transfer to the carbon materials acting as hosts is therefore required to maintain electrical neutrality of the whole system. The negative charge which can be accepted by carbon has a limitation. In the case of intercalation, therefore, $C_6Li$ is a stoichiometric limitation (372 Ah/kg as capacity per weight). Since the carbon materials of the present invention require no charge transfer to carbon, it becomes possible to absorb lithium without being restricted by the stoichiometric limitation of intercalation.

As a means for confirming the presence of the covalent lithium molecule, a solid high resolution $^7Li$-NMR spectrum can be used. The NMR peak of the covalent lithium molecule exists within the range of $-1$ to 2 ppm in the chemical shift $\delta$, and the value of the chemical shift scarcely varies depending on the amount of lithium absorbed. This is because the absorption of covalent lithium is not accompanied by the charge transfer to the carbon material. The peak has the shape of a Lorenzian curve. The reason for this is that the magnetic influence from the peripheral nuclei is averaged because the lithium molecules absorbed move considerably freely like liquid.

The NMR peak of the intercalated lithium ion has the positive chemical shift, and the value of the chemical shift varies according to the amount absorbed and the distance between a carbon skeleton and the lithium ion. This is because the chemical shift is caused by an interaction between the electron spin and a nuclear spin contained in the unpaired electron formed by the charge transfer to carbon. The peak has the shape of a Gaussian curve. This reflects the influence of anisotropy of a magnetic field formed by the peripheral nuclei, because the lithium ions are restricted by the Coulomb force between the ions and the carbon material to move like solid.

In the present invention, it is essential that lithium can be absorbed as the covalent lithium molecule $Li_2$. This makes it possible to absorb lithium in a large amount of 6 times the limitation of the capacity previously considered. The present invention includes carbon materials in which the covalent lithium molecules and the lithium ions exist together. That case has the advantage that the discharge current can be increased, because the lithium ions can be rapidly discharged. After discharge of the lithium ions, the lithium molecules are dissociated, and give electrons to carbon, thus being turned into lithium ions. The covalent lithium molecules can therefore be considered to be storage houses for the lithium ions.

Thus, the carbon materials having the chemical shift exceeding the above-mentioned range absorb alkali ions by intercalation, and do not appear to be the alkali ion-absorbing/desorbing carbon materials of the present invention.

The alkali ion-absorbing/desorbing carbon materials of the present invention absorb and desorb alkali ions, and exhibit an excellent performance for lithium ions, among others.

The alkali ion-absorbing/desorbing carbon material of the present invention has the condensed aromatic ring structure, but the stacked structure is not developed. The alkali ions such as lithium are not absorbed by intercalation, so that the alkali ions are absorbed on and desorbed from a plane of the condensed aromatic ring, not between the layers. Such absorbing/desorbing reaction is not restricted by the stoichiometric ratio of intercalation compounds. Accordingly, the amount of the alkali ions absorbed and desorbed can be significantly increased.

Further, the alkali ions do not go in and out between the layers, so that the structure of the material is little changed by absorption and desorption. Furthermore, since the stacked structure is not developed, the paths of absorbing/desorbing alkali ions are not restricted to one direction parallel to the plane, and can permeate from any directions, resulting in a high absorbing/desorbing reaction rate.

The use of such alkali ion-absorbing/desorbing carbon materials of the present invention as electrode materials provides batteries having a very high capacity, improved cycle stability and the ability to charge and discharge at a large current. The alkali ion-absorbing/desorbing carbon materials of the present invention are therefore excellent as the electrode materials for secondary batteries.

The carbon material of the present invention, which has the condensed aromatic ring structure, is composed of the randomly stacked structure, has an A/C atomic ratio (wherein A represents an alkali metal element, and C represents carbon) of 0.125 to 1, and has at least two peaks of the chemical shift $\delta$ in an NMR spectrum of an alkali atomic nucleus, one peak (B) being 0±2 ppm and another peak (A) existing on the plus side of the peak (B), when the material has absorbed alkali ions.

The hydrogen/carbon atomic ratio (H/C) of the carbon material used in the present invention is 0.05 to 0.6, and preferably 0.15 to 0.6. A ratio of less than 0.05 means a development of the graphite structure and destruction of the crystal structure by expansion and contraction of crystals upon the doping-dedoping reaction of lithium corresponding to charge and discharge, which results in deterioration of cycle stability. On the other hand, the material of a ratio exceeding 0.6 markedly decreases discharge capacity.

When allowed to absorb an alkali element, preferably lithium, the carbon materials of the present invention have an A/C atomic ratio of 0.125 to 1, and preferably 0.33 to 0.67. An A/C atomic ratio of less than 0.125 does not show the peak (A), namely provides no absorption of lithium ions directly acting on discharge, and it becomes difficult to exhibit the charge-discharge effect. On the other hand, it becomes difficult to absorb lithium ions with a ratio exceeding 1.

The carbon materials having an A/C atomic ratio within the range described above in which alkali ions have been absorbed can exceed 372 Ah/kg, which is the stoichiometric limitation of the lithium-graphite intercalation compounds as a charge capacity, when the materials are used as anodes for lithium secondary batteries.

Furthermore, the carbon materials of the present invention in which alkali ions have been absorbed have at least one peak of the chemical shift $\delta$ in the NMR spectrum, and the peak (B) shows a shift of 0±2 ppm. It is preferred that the materials have another peak (A), which shows a shift to the plus side.

When the alkali element is lithium, the observation nucleus is $^7$Li, and the basis of the chemical shift is a value at the time when the peak of a 1 mol/liter aqueous solution of LiCl is taken as 0.

The presence of the peak (B) of the chemical shift $\delta$ within the range described above means that the density of unpaired electrons on alkali ions become almost 0, namely that the alkali ions are turned into covalent $Li_2$ molecules.

The alkali ion-absorbing/desorbing carbon materials of the present invention are usually in a powder or solid form, and can be mechanically pulverized to obtain the excellent electrode materials for secondary batteries.

When the anodes are prepared using these electrode materials, the particle size of the electrode materials is not necessarily restricted. However, high-performance anodes can be produced by use of electrode materials having an average particle size of 5 µm or less. In this case, binders such as polyethylene powder are added to these powders and mixed therewith, followed by rolling with rolls. Thus, the anodes can be produced. The amount of the binder compounded is 5 to 50 parts by weight per 100 parts by weight of electrodes, and preferably 5 to 30 parts by weight.

Here, as the binders, either organic or inorganic binders can be used. As the organic binders, in addition to polyethylene described above, a number of binders such as fluorine resins such as polytetrafluoroethylene and polyvinylidene fluoride, polyvinyl alcohol and polyvinyl chloride can be used.

Further, as the inorganic binders, silicon binders such as silicon glass can be used. Also in this case, heat treatment at a temperature exceeding the melting point is required to allow them to perform as the binders.

The anode bodies thus obtained can support lithium or alkali metals mainly composed of lithium to use them as the anodes for lithium batteries.

Methods for supporting the lithium or alkali metals include any methods which have previously been employed, such as thermal diffusion by contact with lithium foil, electrochemical doping of lithium in lithium salt solutions, and diffusion of lithium in carbon materials by immersion in molten lithium.

The alkali ion-absorbing/desorbing carbon materials of the present invention can be widely used as the anodes of the lithium batteries, and can be used in combination with various cathodes, for example, cathodes using oxides such as manganese dioxide and vanadium pentaoxide or organic polymers such as polypyrrole.

As nonaqueous electrolytes used in the batteries in which the electrode materials comprising the alkali ion-absorbing/desorbing carbon materials of the present invention are used, any may be employed as long as the nonaqueous substances are chemically stable to cathode materials and anode materials, and lithium ions can move therein to conduct electrochemical reaction with active cathode substances. As the electrolytes, compounds composed of combinations of cations and anions are particularly used. The cations include $Li^+$, and examples of the anions include halide anions of the group Va elements such as $PF_6^-$, $AsF_6^-$ and $SbF_6^-$; halogen anions such as $I^-$, $I_3^-$, $Br^-$ and $Cl^-$; perchlorate anions such as $ClO_4^-$; and anions such as $HF_2^-$, $CF_3SO_3^-$ and $SCN^-$. However, they are not necessarily limited to these anions. Concrete examples of the electrolytes having such cations and anions include $LiPF_6$, $LiAsF_6$, $LiSbF_6$, $LiBF_4$, $LiClO_4$, $LiI$, $LiBr$, $LiCl$, $LiAlCl_4$, $LiHF_2$, $LiSCN$ and $LiCF_3SO_3$. Of these, $LiPF_6$, $LiAsF_6$, $LiSbF_6$, $LiBF_4$, $LiClO_4$ and $LiCF_3SO_3$ are particularly preferred.

The nonaqueous electrolytes are usually used in the state where they are dissolved in solvents. In this case, there is no particular limitation on the solvents. However, the solvents having a relatively large polarity are favorably used. Specifically, they include propylene carbonate, ethylene carbonate, tetrahydrofuran, 2-methyltetrahydrofuran, dioxolane, dioxane, ethylene glycol dimethyl ether, glymes such as diethylene glycol dimethyl ether, lactones such as γ-butylolactone, phosphates such as triethyl phosphate, borates such as triethyl borate, sulfur compounds such as sulfolane and dimethyl sulfoxide, nitriles such as acetonitrile, amides such as dimethylformamide and dimethylacetamide, dimethyl sulfate, nitromethane, nitrobenzene and dichloroethane, which may be used alone or as mixtures of at least two kinds of them. Of these, one selected from propylene carbonate, ethylene carbonate, butylene carbonate, tetrahydrofuran, 2-methyltetrahydrofuran, dioxane, ethylene glycol dimethyl ether, dioxolane and γ-butylolactone or a mixture of at least two kinds of them is particularly preferred.

Further, as these nonaqueous electrolytes, there can be used organic solid electrolytes in which polymers such as polyethylene oxide, polypropylene oxide, polyethylene oxide crosslinking with isocyanates and phosphazene polymers having ethylene oxide oligomers as side chains are impregnated with the above-mentioned nonaqueous electrolytes; and inorganic solid electrolytes such as inorganic ion derivatives such as $Li_3N$ and $LiBCl_4$, and lithium glass such as $Li_4SiO_4$ and $Li_3BO_3$.

The lithium secondary battery using the electrode material comprising the alkali ion-absorbing/desorbing carbon material of the present invention will be described in more detail with reference to the drawing.

Namely, in the lithium secondary battery using the electrode material comprising the alkali ion-absorbing/desorbing carbon material of the present invention in the anode, as shown in FIG. 1, the inside of a button-shaped cathode case 10 whose opening 10a is sealed with an anode cap 20 is partitioned with a separator 30 having fine pores, and a cathode 50 having a cathode collector 40 arranged on the side of the cathode case 10 is accommodated in the partitioned space on the cathode side, whereas an anode 70 having an anode collector 60 arranged on the side of the anode cap 20 is accommodated in the space on the anode side.

As the separator 30, one which is porous and through which the electrolytes can be passed or which can contain them, for example, a nonwoven, woven or knitted fabric made of a synthetic resin such as polytetrafluoroethylene, polypropylene or polyethylene, can be used.

Further, as the cathode material used for the cathode 50, a sintered particle material such as lithium-containing vanadium pentaoxide or lithium-containing manganese dioxide can be used.

The reference numeral 80 designates an insulating packing made of polyethylene which is arranged along the inner surface of the cathode case 10 for supporting the anode cap 20 in an insulated state.

The alkali ion-absorbing/desorbing carbon material of the present invention has the condensed aromatic ring structure, but the stacked structure is not developed. The alkali ions such as lithium are not intercalated between the layers, but the alkali ions are absorbed on and desorbed from a plane of the condensed aromatic ring structure. Such absorbing/desorbing reaction is not restricted by the stoichiometric ratio of intercalation compounds. Accordingly, the amount of the alkali ions absorbed and desorbed can be extremely increased.

The capacity of the battery can therefore be increased by use of this carbon material as the electrode material.

Further, the alkali ions do not go in and out between the layers, so that the structure of the material is little changed by absorption and desorption. When used as the electrode material, the battery is excellent in cycle stability.

Furthermore, since the stacked structure is not developed, the alkali ions are not restricted to one direction parallel to the plane, and can permeate from any direction. Accordingly, the reaction rate is increased, and charge and discharge of a large current become possible.

The use of the alkali ion-absorbing/desorbing carbon materials of the present invention as the electrode materials of secondary batteries, particularly nonaqueous electrolyte secondary batteries such as lithium batteries, provides batteries having a very high capacity, improved in cycle stability and possible to withstand charge and discharge at high current density.

In the alkali ion-absorbing/desorbing carbon materials of the present invention, the amount of alkali ions absorbed can be substantially increased, and changes in structure on charge and discharge can be avoided. Further, the rate of the absorption-desorption reaction of alkali ions can be increased. These materials are very useful as the electrode materials, and the use thereof can provide secondary batteries having a high capacity, improved in cycle stability and possible to withstand charge and discharge at high current density.

The present invention is hereinafter described in more detail with reference to examples, but it is not limited to these examples.

EXAMPLE 1

10.6 g (45 mmol) of p-dibromobenzene and 0.787 g (2.5 mmol) of 1,3,5-tribromobenzene were reacted with 1.22 g (50 mmol) of magnesium in tetrahydrofuran to synthesize a Grignard reagent, and 65 mg of a nickel chloride-2,2'-bipyridine complex was added thereto, followed by reflux for 4 hours. The reaction mixture was put into diluted hydrochloric acid and stirred, followed by filtration. The filtered solid matter was washed with distilled water, ethanol, hot toluene and ethanol in this order, and then dried under vacuum at 80° C., thereby obtaining poly(phenylene) containing 5.26 mol % of benzene rings bonded at the 1-, 3- and 5-positions.

The temperature of the poly(phenylene) containing the branching structure was elevated to 300° C. in a stream of hydrogen for 1 hour, and then to 700° C. at a programming rate of 50° C./hour. The heating was stopped at the time when the temperature reached 700° C., followed by furnace cooling.

Figure 2:
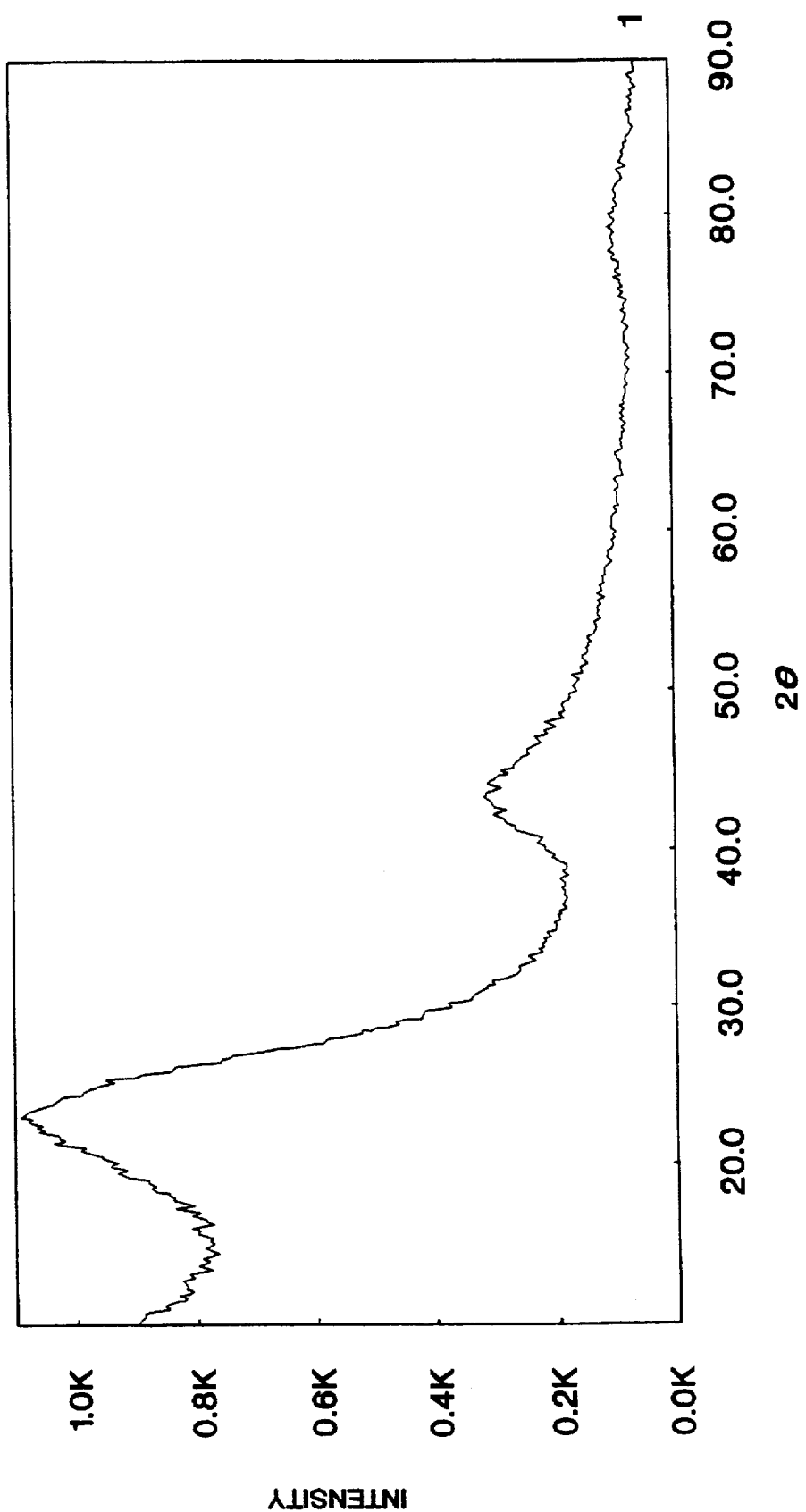
FIG. 2 is an X-ray diffraction pattern of the carbon material obtained in Example 1.

An X-ray diffraction pattern of the carbon material thus obtained is shown in FIG. 2. This shows no particular pattern and is amorphous.

Figure 3:
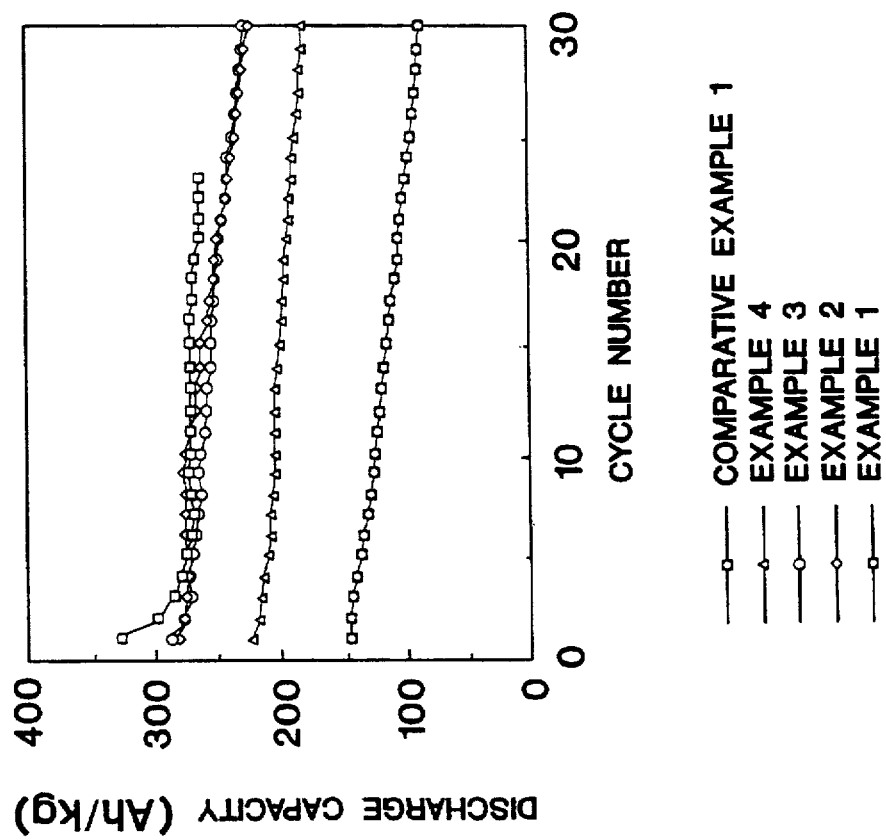
FIG. 3 is a graph showing evaluation results of Examples 1 to 4 and Comparative Example 1.

As a binder, powdered polyethylene was mixed with the carbon material thus obtained so as to give 20% by weight, and the mixture was pressed at a pressure of $9.8 \times 10^8$ P to produce an anode. Charge and discharge were repeated for the anode thus produced. The discharge capacity per weight is shown in FIG. 3.

Evaluation of the discharge capacity was conducted in the following manner. That is, a battery was assembled using the resulting anode, Li as a counter electrode and a 1 mol/liter solution of $LiClO_4$ in an ethylene carbonate/ethylene glycol dimethyl ether (ratio by volume=1:1) solvent as an electrolyte, and the half cell evaluation was carried out. Li was used as a reference electrode, and the evaluation was conducted at a charge-discharge current density of 1.6 mA/cm$^2$ at a charge cut-off potential of +10 mV to Li/Li$^+$ at a discharge cut-off potential of 3 V to Li/Li$^+$.

Comparative Example 1

Poly(phenylene) was synthesized in a manner similar to that of Example 1, with the exception that 1,3,5-tribromobenzene was not used and 11.8 g (50 mmol) of p-dibromobenzene was used. The polymer thus obtained was poly(p-phenylene) formed by bonding only at p-positions. This poly(p-phenylene) was heat treated, and an anode was produced to conduct the half cell evaluation in a manner similar to that of Example 1. Results are shown in FIG. 3.

EXAMPLE 2

Synthesis and evaluation were conducted in a manner similar to that of Example 1, with the exception that 1,2,4-tribromobenzene was substituted for 1,3,5-tribromobenzene. Results are shown in FIG. 3.

EXAMPLE 3

Synthesis and evaluation were conducted in a manner similar to that of Example 1, with the exception that 1.18 g (5 mmol) of o-dibromobenzene was substituted for 1,3,5-tribromobenzene. Results are shown in FIG. 3.

EXAMPLE 4

Synthesis and evaluation were conducted in a manner similar to that of Example 1, with the exception that 1.18 g (5 mmol) of m-dibromobenzene was substituted for 1,3,5-tribromobenzene. Results are shown in FIG. 3.

As apparent from FIG. 3, introduction of the branching structures (Examples 1 and 2) or the o-bonding and the m-bonding (Examples 3 and 4) into poly(p-phenylene) increases the discharge capacity as the anode, compared with poly(p-phenylene) formed by bonding only at the p-positions.

EXAMPLE 5

Poly(phenylene) was synthesized by the Kovacic method [P. Kovacic and A. Kyriakis, *Journal of the American Chemical Society*, 85, 454–458 (1963)]. Namely, cupric chloride ($CuCl_2$), aluminum chloride (anhydrous) ($AlCl_3$) and benzene ($C_6H_6$) were mixed with one another to yield a molar ratio of 1:1:4, and stirred in an atmosphere of an inert gas. The resulting powder was washed several times with hydrochloric acid (6 N—HCl), and washed with water. Acetone-washing and water-washing were further repeated, followed by drying under vacuum at 100° C. Poly (phenylene) thus synthesized contains stacking-inhibiting factors such as the bending structure, the branching structure and the quinoid structure.

Poly(phenylene) thus synthesized was heat treated in a stream of hydrogen at 700° C. to obtain a carbon material. Specifically, the temperature was elevated from room temperature to 500° C. at a programming rate of 250° C./hour, and from 500° C. to 700° C. at a programming rate of 40° C./hour. The heating was stopped at the time when the temperature reached 700° C., followed by cooling to room temperature. Thus, the carbon material was obtained.

The distance between the (002) planes of the resulting carbon material determined by the X-ray diffraction measurement was about 3.65 Å. The diffraction peak of the (002) planes was very broad in width, and the size of a crystallite in the direction of the C-axis was estimated to be 10 Å or less. That is, the number of stacked layers was 3 or less.

Figure 4A:
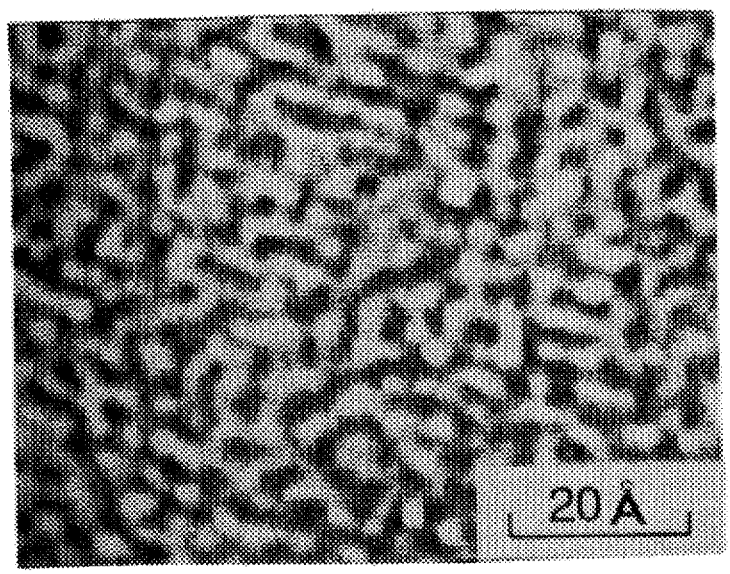
FIG. 4(a) and FIG. 4(b) show photographs of lattice images of the carbon material obtained in Example 5 on a transmission electron microscope (TEM)
Figure 4B:
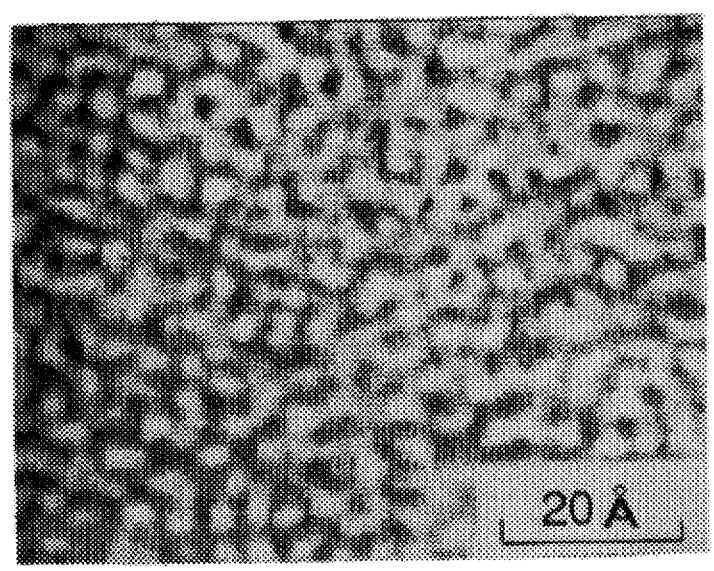

Photographs of lattice images were taken on a transmission electron microscope (TEM) for this material and that charged with lithium ions corresponding to 370 Ah/kg. Results thereof are shown in FIG. 4. (a) shows a photograph of this material, and (b) shows a photograph of the material charged. The black portions indicate carbon net faces, and the white portions indicate spaces.

Figure 5A:
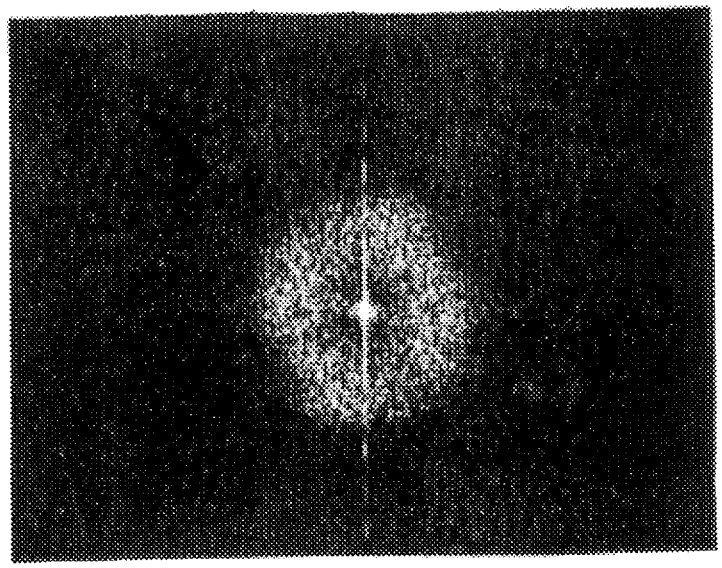
FIG. 5(a) and 5(b) show photographs of the FFT power spectra in Example 5.
Figure 5B:
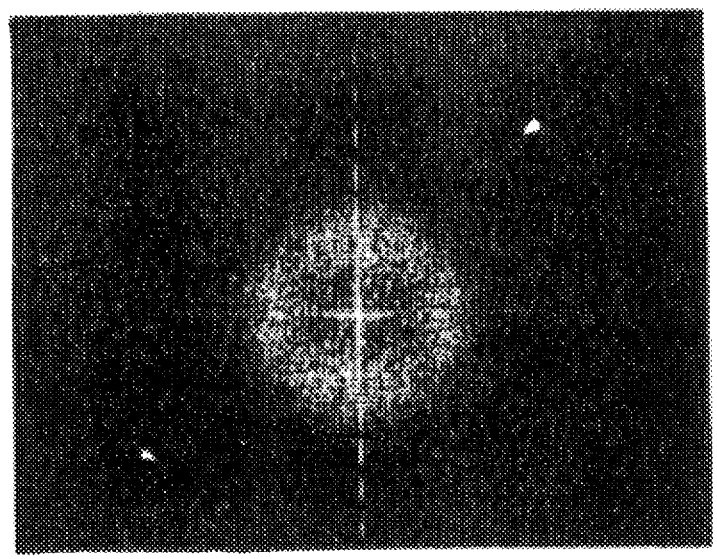
Figure 6:
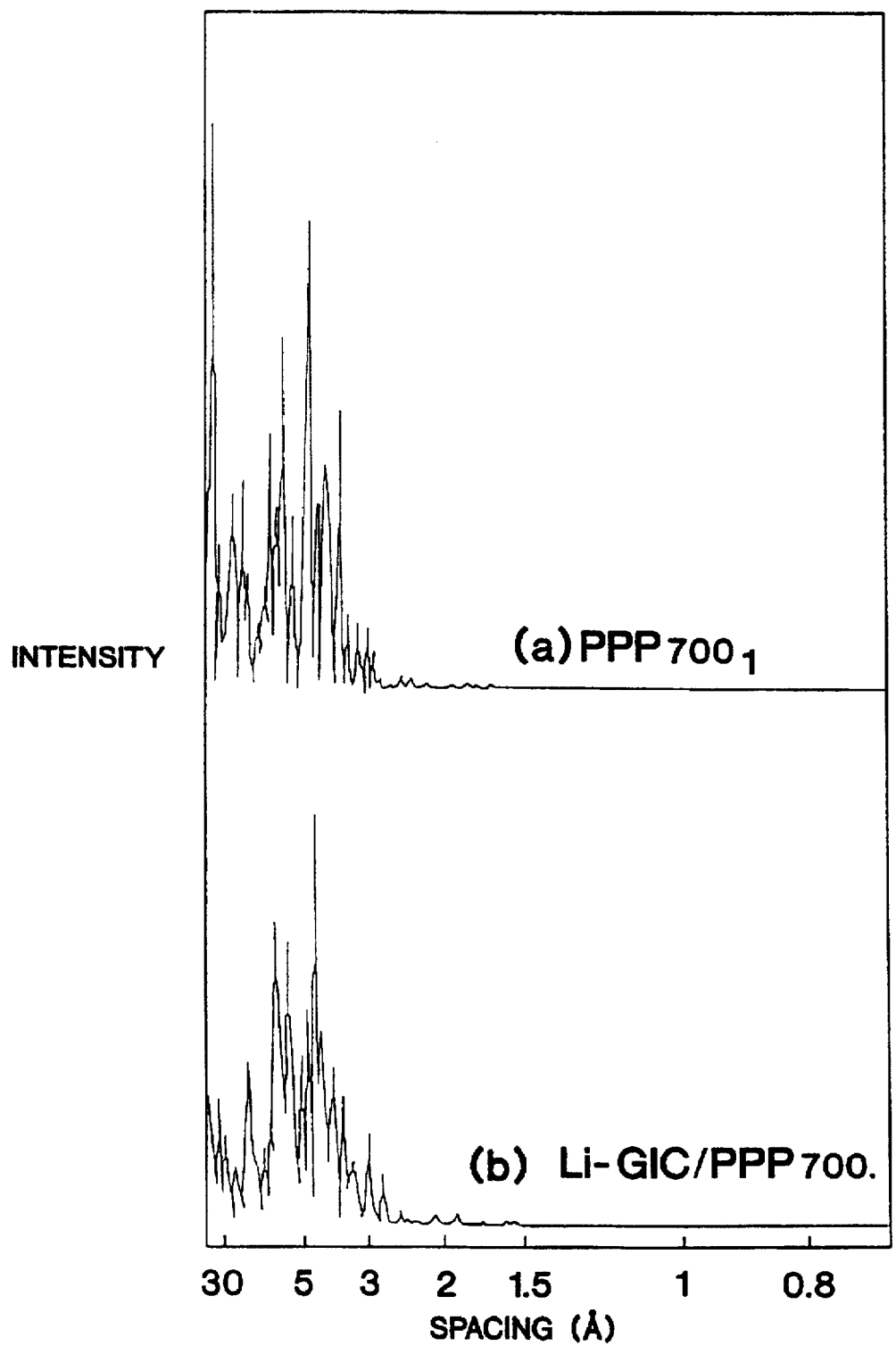
FIG. 6 is a graph showing the distribution of vertical elements of the FFT power spectra in Example 5.

FIG. 5 shows photographs of FFT power spectra of the spacing between carbon net faces and the direction of the spacing. (a) shows a state before charge, and (b) shows a state after charge. The center white point corresponds to an origin, the distance from the center shows the spacing between carbon net faces, and the direction shows the direction of carbon net faces. The white spots form a ring-like shape, which reveals that the direction of carbon net faces has no regularity. This state is little changed even after charge. The distribution of vertical components of the FFT power spectra are further shown in FIG. 6. (a) shows a state before charge, and (b) shows a state after charge. The spacing is not widened before and after charge.

As a binder, 30% by weight of powdered polyethylene was mixed with this material and the mixture was pressed to form an anode. Using this electrode as a working electrode, Li foil as a counter electrode and a reference electrode, and a 1 mol/liter solution of lithium perchlorate in a PC (propylene carbonate)/DME (ethylene glycol dimethyl ether) (ratio by weight=1:1) solvent as an electrolyte, a half cell was constructed. Using this cell, charge and discharge were repeated at a current density of 1.6 mA/cm$^2$, at a charge cut-off potential of 0 mV, at a discharge cut-off potential of 3 V, at a rest time of 20 minutes. This electrode electrochemically absorbed and desorbed lithium ions to function as an anode for a lithium secondary battery.

(Capacity)

Figure 7:
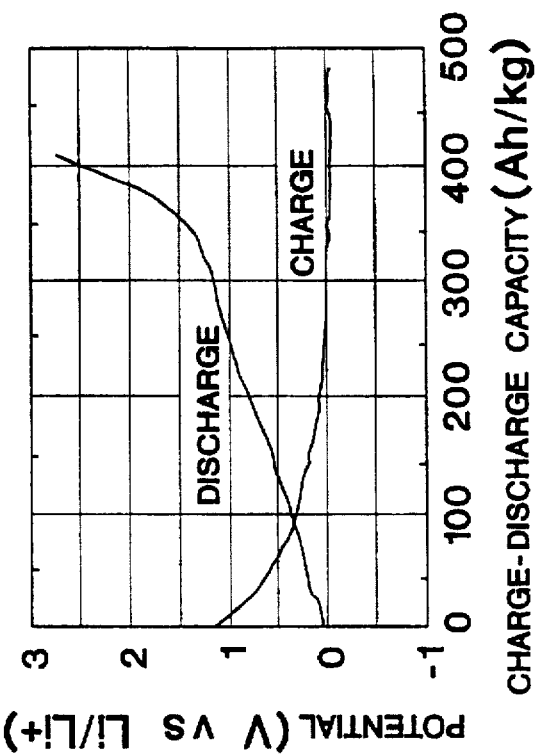
FIG. 7 is a graph showing the charge-discharge potential curves in Example 5.
Figure 8:
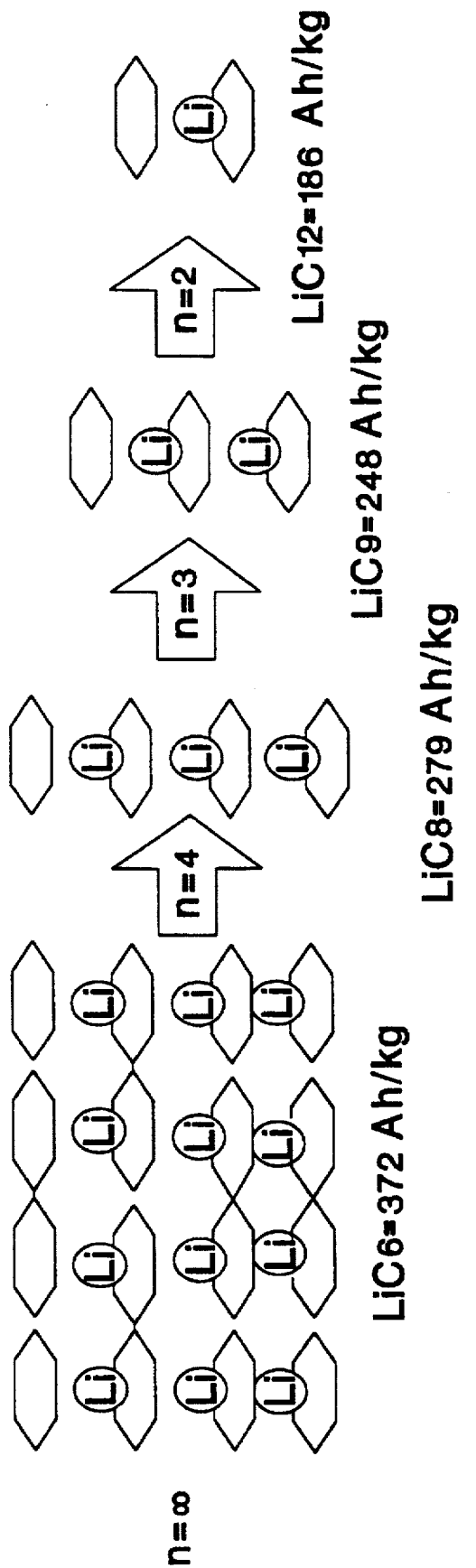
FIG. 8 is a representation showing the relationship between the number of stacked layers and the capacity.

The charge-discharge potential curves are shown in FIG. 7. A discharge capacity of 405 Ah/kg is exhibited. The relationship between the number of stacked layers and the capacity is schematically shown in FIG. 8. As can be seen from this representation, the capacity exceeds 372 Ah/kg which is the limitation in the intercalation reaction. Further, considering that the number of stacked layers estimated from the X-ray diffraction measurement is at most 3, the limitation of the capacity in the intercalation reaction must be 248 Ah/kg. A capacity as high as 405 Ah/kg can not be explained by the intercalation reaction.

(NMR)

Figure 9:
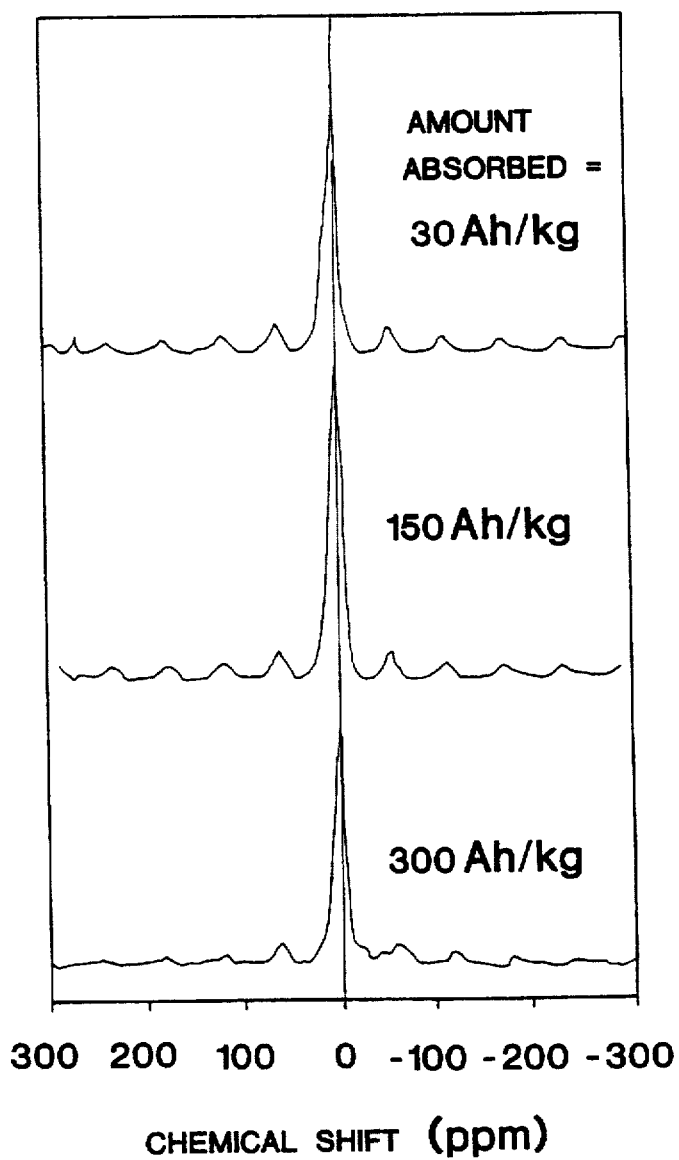
FIG. 9 shows the NMR spectra in Example 5.

These electrodes were charged with 30 Ah/kg, 150 Ah/kg and 300 Ah/kg, respectively, to prepare samples, and the solid high resolution NMR spectra of lithium absorbed were measured. The samples for measurement were washed with ethylene glycol dimethyl ether and dried in an atmosphere of dried argon in a glove box to remove the electrolyte. Then, the samples were mixed with KBr, and NMR sample tubes were filled with the mixture. The observation nucleus is $^7$Li. As the basis of the chemical shift, the peak of a 1 mol/liter aqueous solution of LiCl was taken as 0 ppm. The resulting spectra are shown in FIG. 9. As apparent from FIG. 9, the chemical shift is 0 ppm, independently of the amount of lithium absorbed. The peaks which symmetrically appear on the right and left sides of the maximum peak at an interval of about 60 ppm are spinning side bands.

(Current Density Dependency)

Figure 10:
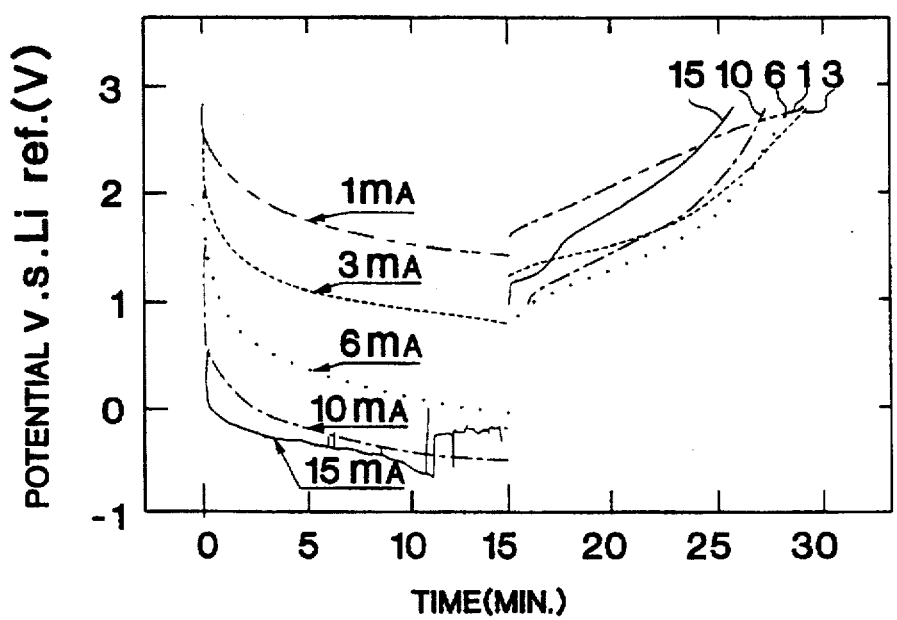
FIG. 10 is a graph showing charge-discharge potential curves when the current density is changed in Example 5.

This electrode was charged and discharged, varying the current density within the range of 1 to 15 mA/cm$^2$, and potential curves were determined. Results are shown in FIG. 10. Noise considered to be caused by deposition of metallic lithium is partly produced at 15 mA/cm$^2$. However, charge and discharge are possible without deposition of metallic lithium even at a current density as high as 10 mA/cm$^2$.

Figure 11:
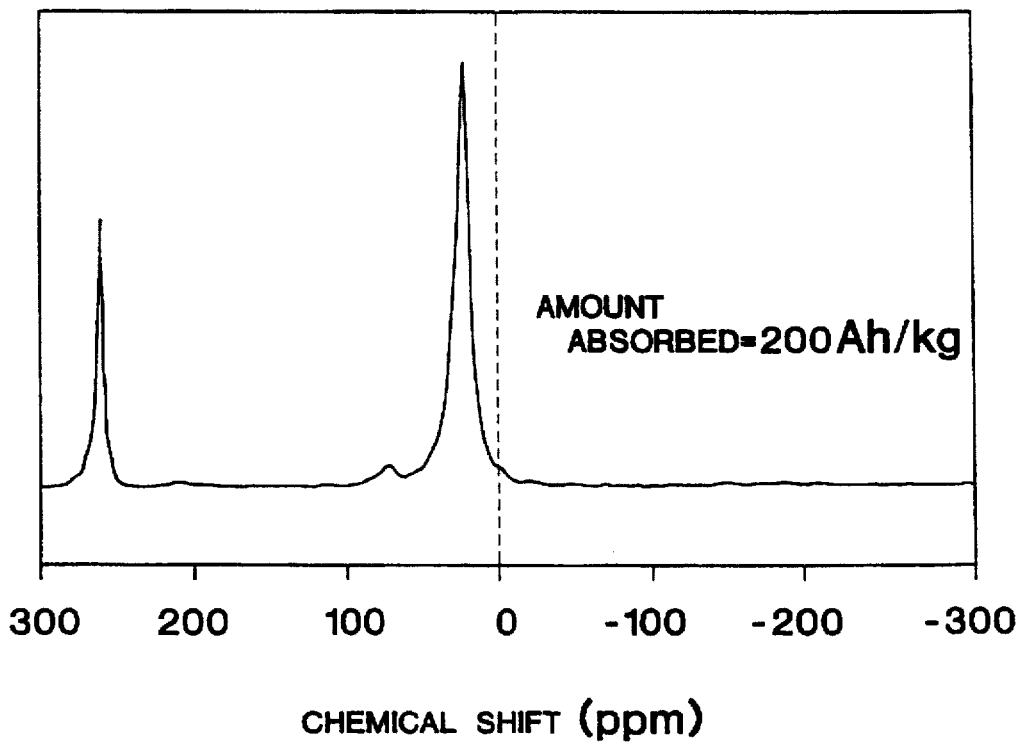
FIG. 11 shows an NMR spectrum in Comparative Example 2.

Morita et al. have reported the discharge capacity at the time when the charge-discharge current density is changed for various carbon materials [Morita et al. *The 15th Shindenchi Koso-bukai Toronkai*, pages 24 to 31 (1992)]. Results thereof, as well as results of measurement obtained by the present inventors for the materials of Example 5, are shown in Table 1.

was measured in a manner similar to that of Example 5. Results are shown in FIG. 11. The maximum peak shows a chemical shift of 26.1 ppm. The peak at 264.2 ppm is due to metallic lithium, which shows that the plating reaction of lithium, in addition to the intercalation of lithium, takes place for porous carbon.

(NMR)

Besides this Comparative Example, it has also been reported that the chemical shift of intercalated lithium takes a positive value (for example, Tanaka et al., *Collected Summaries of Autumn Meeting of Electrochemical Society, Japan*, 1992, page 129). Measurement of materials other than the materials of the present invention by the present inventors also reveals that the chemical shift of intercalated lithium shows a positive value without exception.

This positive chemical shift is caused by the paramagnetic shift due to a radical of the carbon material. The carbon material receives an electron at the same time that lithium is absorbed to keep electrical neutrality. Carbon which has received the electron is turned to a radical anion. Accordingly, the carbon material which has absorbed lithium has an unpaired electron, and the chemical shift is generated by an interaction between magnetic moments of

TABLE 1

| Carbon Material | Capacity at 0.33 mA/cm$^2$ (Ah/kg) | Ratio, Taking Capacity at 0.33 mA/cm$^2$ as 100 | | Crystalline Parameter | |
|---|---|---|---|---|---|
| | | 0.67 mA/cm$^2$ | 1.6 mA/cm$^2$ | D(002) (A) | Lc(A) |
| Example 5 | 228 | 118 | 123 | 3.65 | <10 |
| Mesophase | 246 | 79 | 34 | 3.369 | 257 |
| Natural Graphite | 192 | 70 | 21 | 3.361 | 282 |
| Petroleum Coke | 171 | 85 | 58 | 3.480 | 32 |

In general, carbon is narrowed in D(002) and increased in Lc (the size of a crystallite in the direction of the C-axis) with development of the graphite structure. As can be seen from Table 1, when the current density is increased, carbon having a more developed graphite structure results in a more significant reduction in capacity. On the contrary, the carbon material of Example 5 increases in capacity as the current density is raised higher. This is because the lower current density requires the longer time for 1 cycle, which causes entrance of a large amount of water into the evaluation cell, resulting in a reduction in capacity. If the evaluation is carried out under the conditions of no water entrance, the discharge density is assumed to be approximately identical. Like this, the carbon material of the present invention can be charged and discharged at high current density without a reduction in capacity.

Comparative Example 2

A half cell was constructed in a manner similar to that of Example 5, with the exception that porous carbon was used as the electrode and a 1 mol/liter solution of lithium perchlorate in EC (ethylene carbonate)+DME (ethylene glycol dimethyl ether) (ratio by weight=1:1) as the electrolyte, and the charge-discharge cycle test was conducted. This electrode electrochemically absorbed and desorbed lithium ions to function as an anode for a lithium secondary battery.

This electrode was charged with 200 Ah/kg to prepare a sample, and the solid high resolution NMR spectrum of $^7$Li the electron and a nucleus. According to the theory, the sign of the chemical shift due to an interaction with an electron spin agrees with the sign of the hyperfine coupling coefficient of the electron with the nucleus. The sign of the hyperfine coupling coefficient of $^7$Li is positive, and the radical-induced chemical shift becomes positive. The degree of the chemical shift is proportional to the density of unpaired ions on the observation nucleus. The intercalated lithium ions are trapped between graphite layers. When the graphite layers are changed to the radical anions, therefore, the density of unpaired electrons exists on the lithium ions to some extent, which causes the positive chemical shift.

On the other hand, the carbon materials of the present invention absorb lithium ions by adsorption, not by intercalation, so that carbon can keep a distance from the alkali ions. Accordingly, the density of unpaired electrons on alkali ions become almost 0, and the chemical shift also becomes 0.

Comparative Example 3

(Current Density Dependency)

Figure 12:
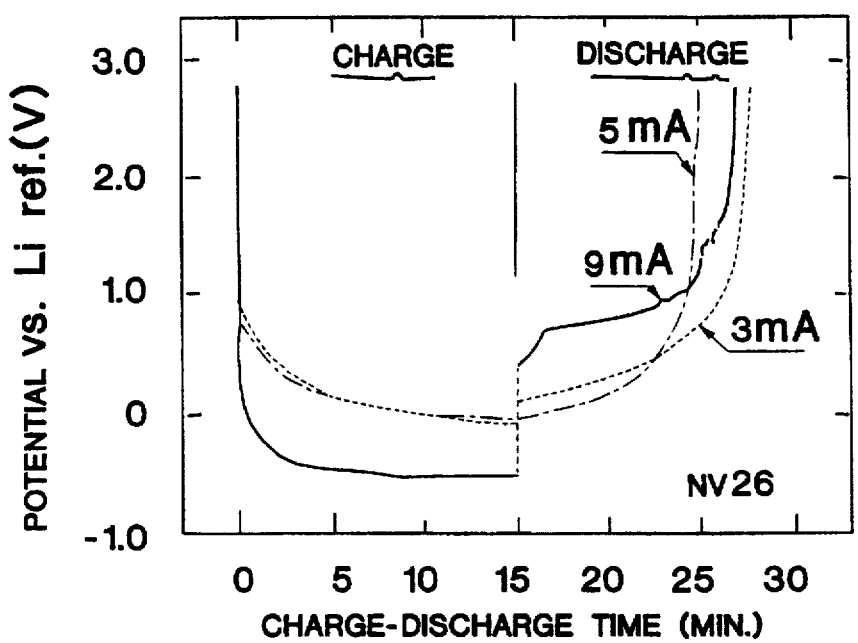
FIG. 12 is a graph showing charge-discharge potential curves in Comparative Example 3.

Using vapor phase growth carbon fiber (VGCF) graphitized at 2,600° C. as the anode, the current density was changed in a manner similar to that of Example 5 to determine charge-discharge potential curves. Results are shown in FIG. 12. The curve for a current density of 9 mA/cm$^2$ on charge has a flat part due to deposition of metallic lithium. On discharge, the elution reaction of metallic lithium first took place, and then desorption from carbon occurred.

The above shows that the chemical shift in the solid high resolution NMR of $^7$Li is 0 ppm, independently of the amount of lithium absorbed. Further, the carbon materials of the present invention shows a discharge capacity of 405 Ah/kg in spite of an average number of stacked layers of 3 or less. This indicates that the carbon materials of the present invention have an absorption-desorption function, different from conventional intercalation/de-interaction reaction. Because of this novel absorption-desorption function, when the carbon materials of the present invention are used as the electrode materials, the batteries have a high charge-discharge capacity, charge and discharge at high current density become possible, and no changes in structure on charge and discharge results in excellent cycle stability.

EXAMPLE 6

Figure 13:
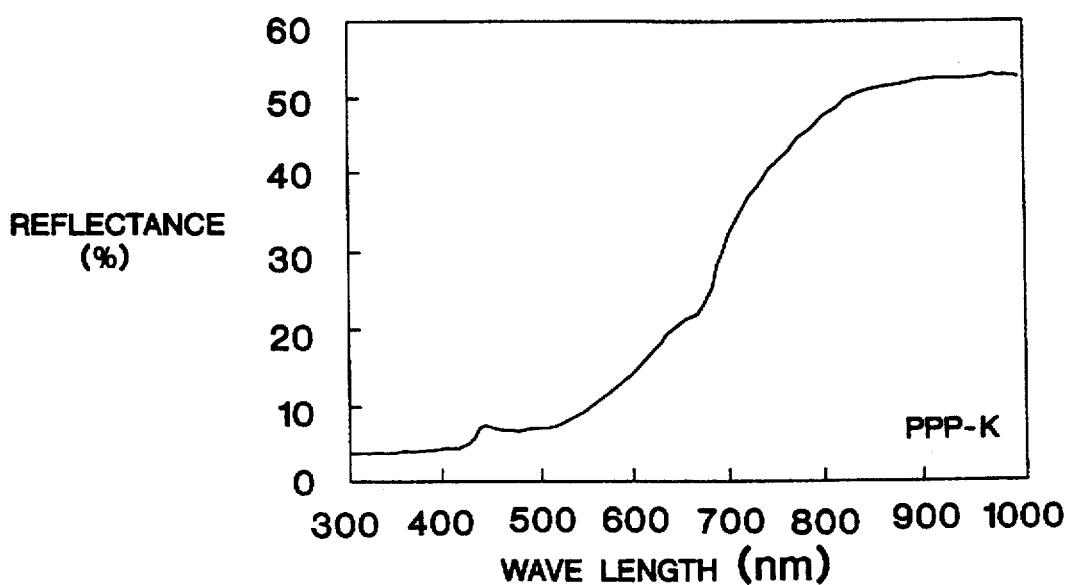
FIG. 13 is a graph showing a diffuse reflectance spectrum of the powdered carbon material obtained in Example 6.

Poly(phenylene) was obtained by the Kovacic method in a manner similar to that of Example 5. Poly(phenylene) thus synthesized is not limited in bonding sites to the p-positions, and contains the o-bonding, the m-bonding, the branching structure and the crosslinking structure, because a starting monomer is benzene. In the Kovacic method, it is known that the quinoid structure is formed by oxidation activity of a polymerization catalyst. The polymer of this example showed a brown color, and an absorption edge was observed at 820 nm in a diffuse reflectance spectrum of a powder thereof. The diffuse reflectance spectrum is shown in FIG. 13. This is the absorption caused by the quinoid structure.

In the infrared absorption spectrum of poly(phenylene), an absorption band assigned to an out-of-plane deformation vibration mode of C—H [$\delta$(para)] was observed in the vicinity of 804 cm$^{-1}$, and absorption bands assigned to vibration modes of the terminal phenyl groups [$\delta$(mono1)] and [$\delta$(mono2)] were observed in the vicinity of 760 cm$^{-1}$ and 690 cm$^{-1}$, respectively. When the absorbance of the respective absorption bands is taken as A[$\delta$(para)], A[$\delta$(mono1)] and A[$\delta$(mono2)], respectively, the R value defined by the following equation is a measure of the degree of polymerization of poly(phenylene).

$$R=A[\delta(para)]/\{A[\delta(mono1)]+A[\delta(mono2)]\}$$

This value was 6.09.

In addition, a result of X-ray diffraction indicated a wide diffraction peak having a half width of 2.372° at 2θ=19.4, which showed low crystallinity.

Such poly(phenylene) obtained by the Kovacic method was heat treated in a stream of hydrogen at 700° C. to obtain a carbon material. According to visual observation during heat treatment, this polymer did not melt until the temperature thereof reached 700° C. The yield in heat treatment was 84%.

Figure 14:
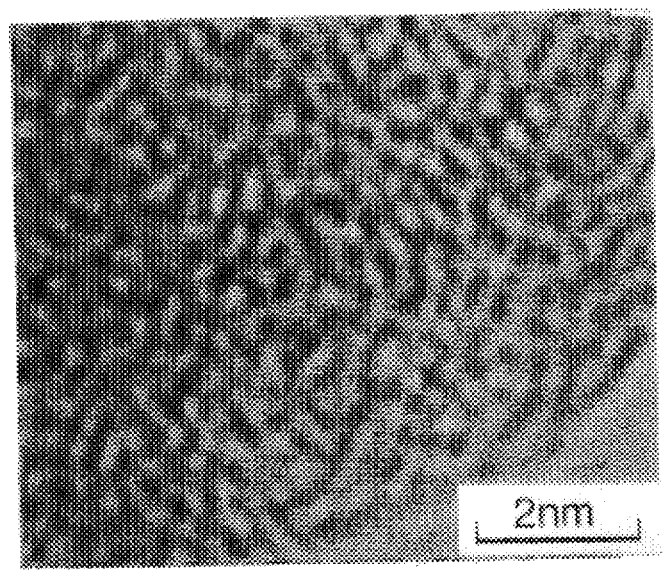
FIG. 14 shows a photograph of a lattice image of the carbon material obtained in Example 6 on a transmission electron microscope (TEM)
Figure 15:
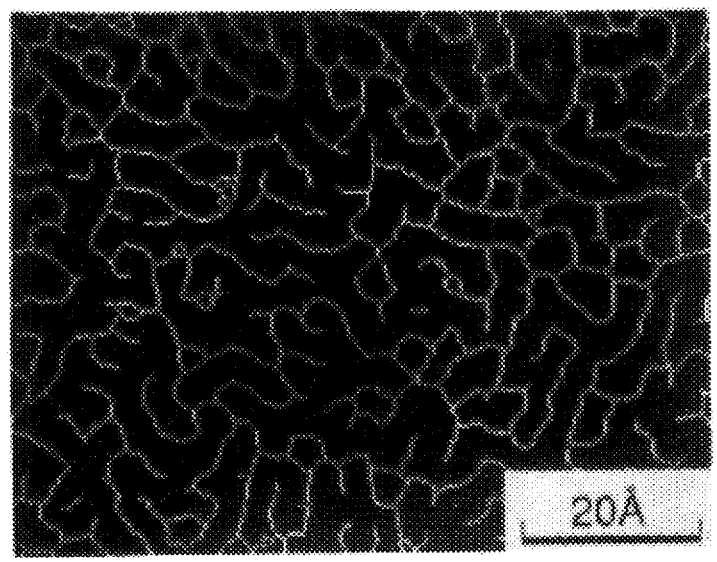
FIG. 15 shows a photograph of a computer image obtained by binary-coding processing of the photograph of the lattice image in Example 6 with a computer.
Figure 16:
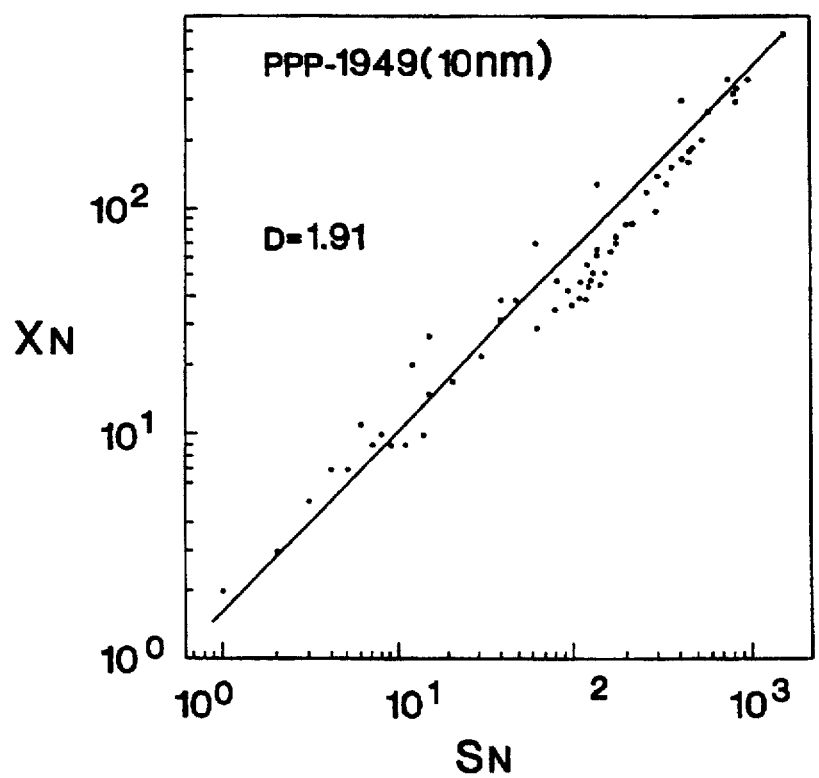
FIG. 16 is a graph showing analytical results of Fractal dimensions D in Example 6.

A photograph of a lattice image of this carbon material was taken on a TEM (manufactured by JEOL Ltd.) at 400 kV. Results thereof are shown in FIG. 14. This was inputted to a computer with an image scanner, and carbon was converted to white and spaces to black by binary-coding processing. Results thereof are shown in FIG. 15. The Fractal dimension was measured for all lines in FIG. 15. Results thereof are shown in FIG. 16. The results showed that the Fractal dimension D was 1.91.

Figure 17:
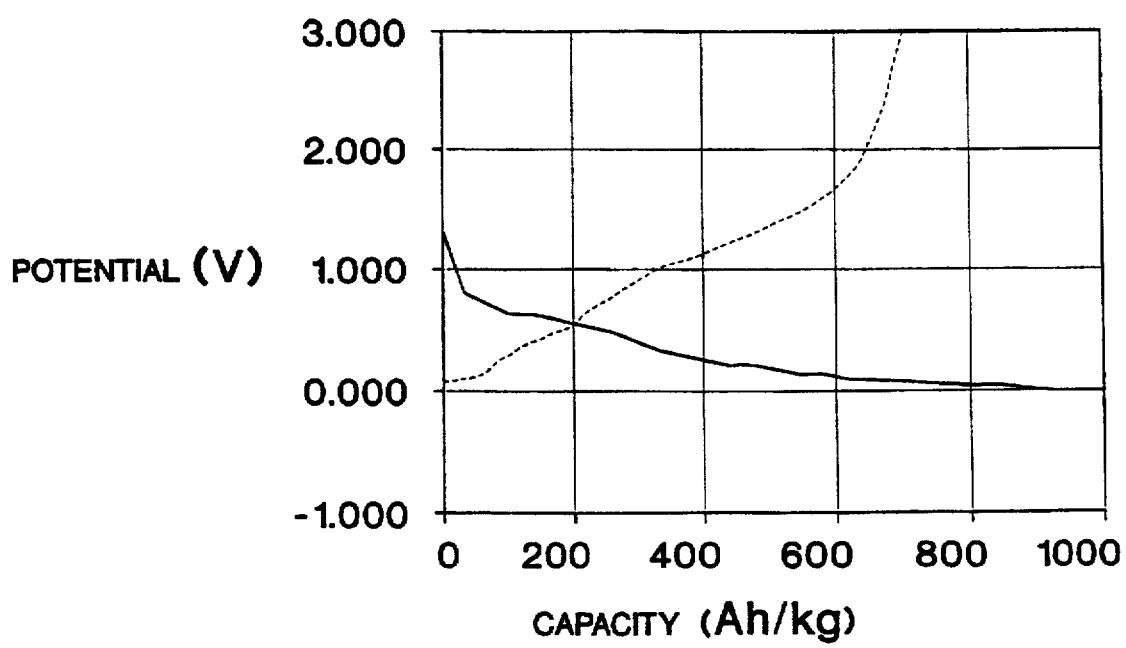
FIG. 17 is a graph showing the charge-discharge curves of an electrode using the carbon material obtained in Example 6.

30% by weight of a polyethylene binder was mixed with this material and an anode having a diameter of 10 mm was prepared by powder compression molding. A 1 mol/liter solution of LiPF$_6$ in a PC (propylene carbonate)/DME (ethylene glycol dimethyl ether) (ratio by volume=1:1) solvent was used as an electrolyte. Li metal was used as a counter electrode and a reference electrode. Evaluation was conducted at a charge-discharge current density of 1.6 mA/cm$^2$, at a charge cut-off potential of 0 mV, at a discharge cut-off potential of 3 V. Charge-discharge curves of this electrode are shown in FIG. 17. This carbon material had a Fractal dimension D of 1.9 and no regular stacking of hexagonal net faces of carbon, therefore resulting in a discharge capacity of 695 Ah/kg. This value largely exceeds a theoretical capacity of 372 Ah/kg in the intercalation reaction between graphite layers which has previously been known.

Comparative Example 4

Figure 18:
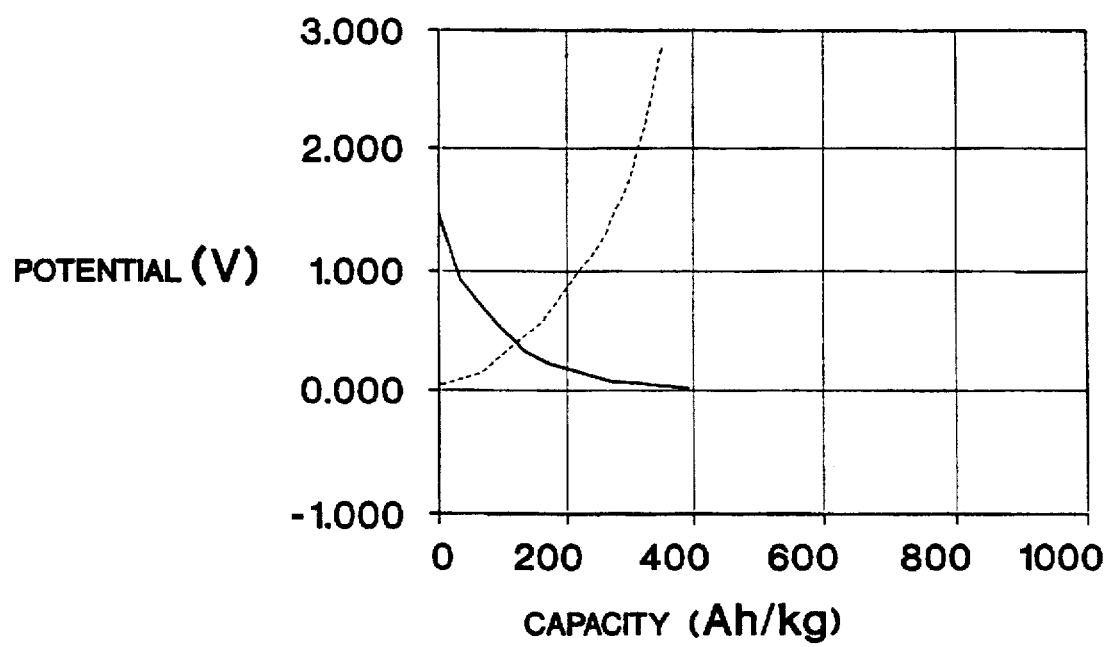
FIG. 18 is a graph showing the charge-discharge curves of an electrode using the carbon material obtained in Comparative Example 4.

Poly(phenylene) obtained in a manner similar to that of Example 6 was heat treated at 1,500° C. to obtain a carbon material. This carbon material had a Fractal dimension D of 1.6 and no randomly stacked structure. For this carbon material, evaluation was conducted in a manner similar to that of Example 6. Charge-discharge curves are shown in FIG. 18. In this carbon material, the stacked structures of hexagonal net faces of carbon are arranged regularly to some extent. Lithium is therefore charged by the intercalation reaction. Consequently, the discharge capacity thereof has a limitation of 372 Ah/kg.

Comparative Example 5 p-Dibromobenzene was allowed to react with equimolar magnesium in tetrahydrofuran to synthesize a Grignard reagent. A catalytic amount of a nickel chloride-2,2'-bipyridine complex was added thereto, and reflux was conducted for 4 hours. The reaction mixture was put into dilute hydrochloric acid and stirred, followed by filtration. The filtered solid matter was washed with distilled water, ethanol, hot toluene and ethanol in this order, and then dried under vacuum at 80° C., thereby obtaining poly(p-phenylene) formed by bonding only at the p-positions and having no branching or crosslinking structure.

Figure 19:
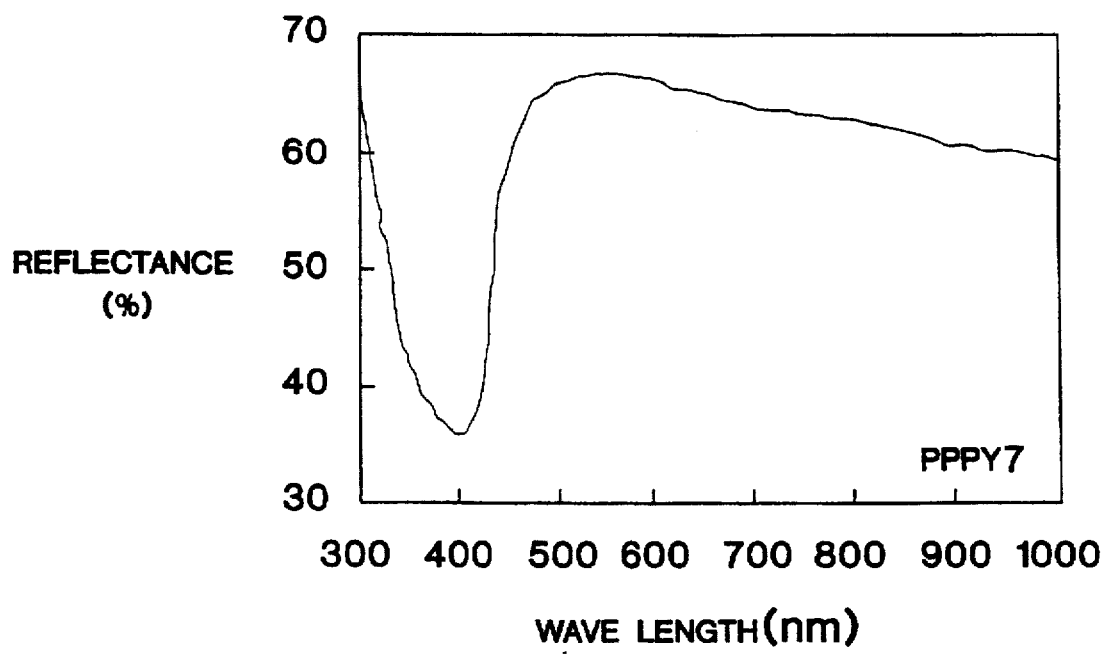
FIG. 19 is a graph showing a diffuse reflectance spectrum of the powdered carbon material obtained in Comparative Example 5.

In this process, no oxidizing agent was used, so that the quinoid structure was not formed. A powder of this polymer had a light yellow color. The diffuse reflectance spectrum had little absorption in the visible region, and a absorption edge was observed at 470 nm. The diffuse reflectance spectrum is shown in FIG. 19.

The R value determined from the infrared absorption spectrum was 1.91.

The X-ray diffraction indicated a sharp diffraction peak having a half width of 0.72° at 2θ=19.6, which showed high crystallinity.

This polymer was heat treated in a manner similar to that of Example 6. According to visual observation during heat treatment, melting was observed. The yield in heat treatment was 38%.

The initial discharge capacity determined in a manner similar to that of Example 6 was 150 Ah/kg.

EXAMPLE 7

Poly(phenylene) was synthesized by the Kovacic method. Namely, cupric chloride (CuCl$_2$), aluminum chloride (anhydrous) (AlCl$_3$) and benzene (C$_6$H$_6$) were mixed with one another to yield a molar ratio of 1:1:4, and stirred in an atmosphere of an inert gas. The resulting powder was washed several times with hydrochloric acid (6 N—HCl), and washed with water. Acetone-washing and water-washing were further repeated, followed by drying under vacuum at 100° C. Poly(phenylene) thus synthesized contains stacking inhibiting factors such as the bending structure, the branching structure and the quinoid structure.

Poly(phenylene) thus synthesized was heat treated in a stream of hydrogen at 700° C. to obtain a carbon material (hereinafter also referred to as a 700° C. heat-treated material). Specifically, the temperature was elevated from room temperature to 500° C. at a programmed rate of 250° C./hour, and from 500° C. to 700° C. at a programmed rate of 40° C./hour. The heating was stopped at the time when the temperature reached 700° C., followed by cooling to room temperature. Thus, the carbon material was obtained.

The distance between the (002) planes of the resulting carbon material determined by the X-ray diffraction measurement was about 3.65 Å. The diffraction peak of the (002) planes was very broad in width, and the size of a crystallite in the direction of the C-axis was estimated to be 10 Å or less. That is, the number of stacked layers was 3 or less.

As a binder, 30% by weight of polyethylene powder was mixed with this carbon material and the mixture was pressed to form an anode. Using this electrode as a working electrode, Li foil as a counter electrode and a reference electrode, and a 1 mol/liter solution of lithium perchlorate in a PC (propylene carbonate)/DME (ethylene glycol dimethyl ether) (ratio by volume=1:1) solvent as an electrolyte, a half cell was constructed. Using this cell, charge and discharge were repeated at a current density of 1.6 mA/cm$^2$, at a charge cut-off potential of 0 mV, at a discharge cut-off potential of 3 V, at a rest time of 20 minutes each. This electrode electrochemically absorbed and desorbed lithium ions to function as an anode for a lithium secondary battery.
(Capacity)

Figure 20:
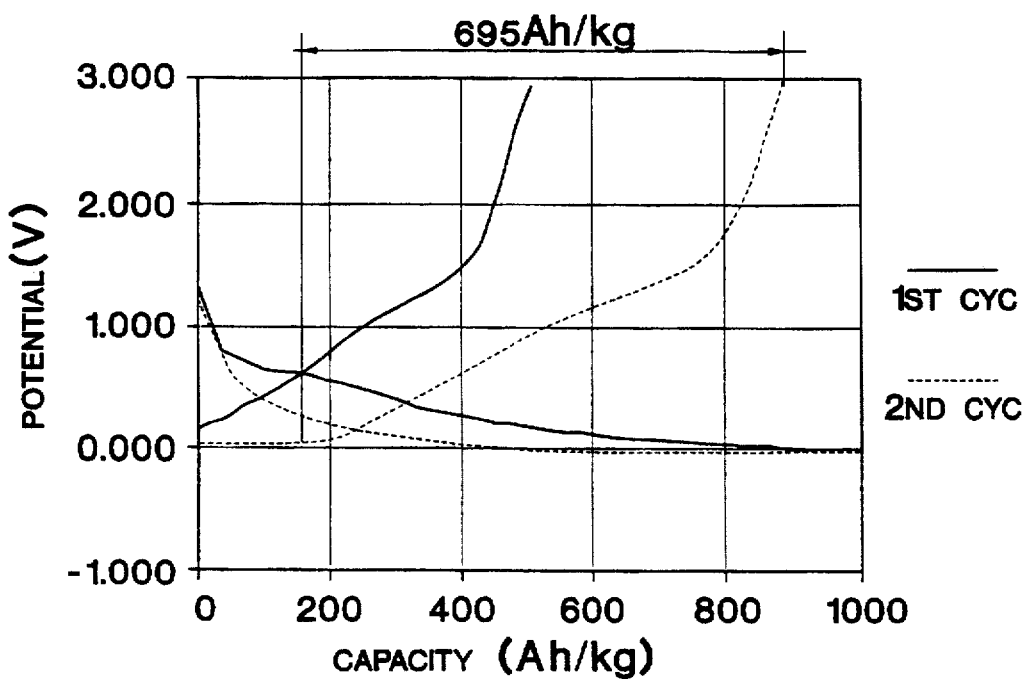
FIG. 20 is a graph showing the charge-discharge potential curves in Example 7.

The charge-discharge potential curves are shown in FIG. 20. FIG. 20 shows an example in which the 700° C. heat-treated material was used.
(NMR)

Figure 21:
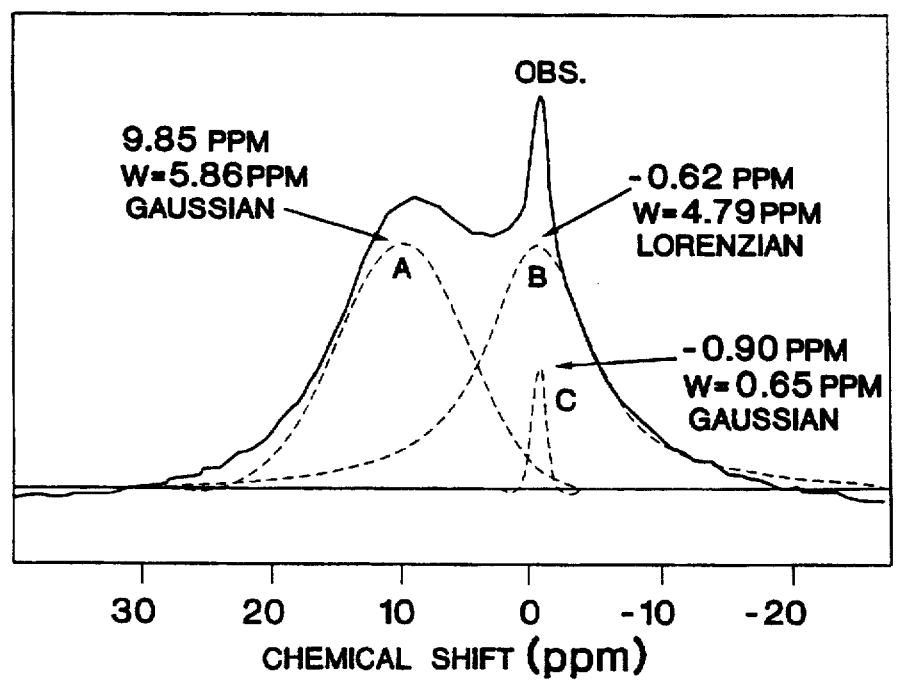
FIG. 21 is a graph showing an NMR spectrum in Example 7.

The electrode made of the above-mentioned 700° C. heat-treated material was charged with 1,000 Ah/kg to prepare a sample, and the solid high resolution NMR spectrum of lithium absorbed was measured. The sample for measurement was washed with DME (ethylene glycol dimethyl ether) and dried in an atmosphere of dried argon in a glove box to remove the electrolyte. Then, the sample was mixed with KBr, and an NMR sample tube was filled with the mixture. The observation nucleus is $^7$Li. As the basis of the chemical shift, the peak of a 1 mol/liter aqueous solution of LiCl was taken as 0 ppm. The resulting spectrum is shown in FIG. 21. FIG. 21 reveals that peak (B) exists at 0±2 ppm, about 0 ppm in this example, and that peak (A) exists on the plus side of said peak (B), at about 10 ppm in this example.

Peak (B) has a Lorenzian line shape, and suggests liquid-like motion. This can be assigned to a covalent Li$_2$ molecule, because the chemical shift is almost 0 ppm. Up to 300 Ah/kg, almost only site (B) is occupied.

On the other hand, peak (A) has a Gaussian line shape, and shows solid-like behavior. This can be assigned to an ionic Li$^+$, because it has a positive chemical shift. This chemical shift is caused by the interaction between an electron spin and a nuclear spin of a radical formed by electron injected into carbon on charge. Dischargeable Li$^+$ is Li$^+$ of site (A). Peak (C) can be assigned to an ionic crystal of Li, and is assumed to be due to lithium carbonate (by-product) detected by ESCA measurement.
(Structural Representation)

Figure 22A:
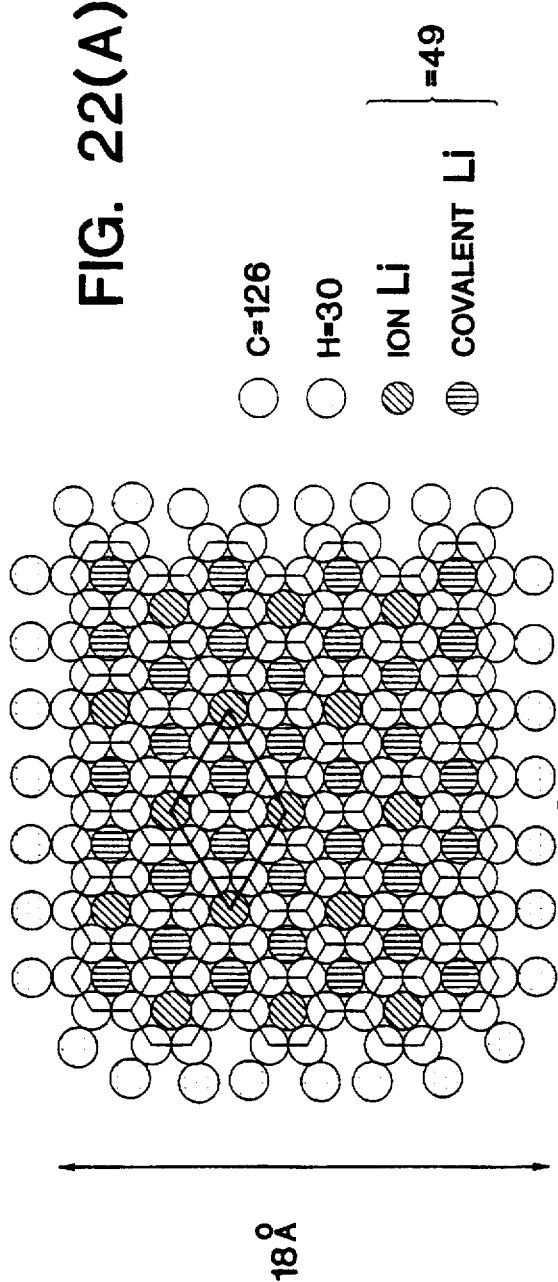
Figure 22B:
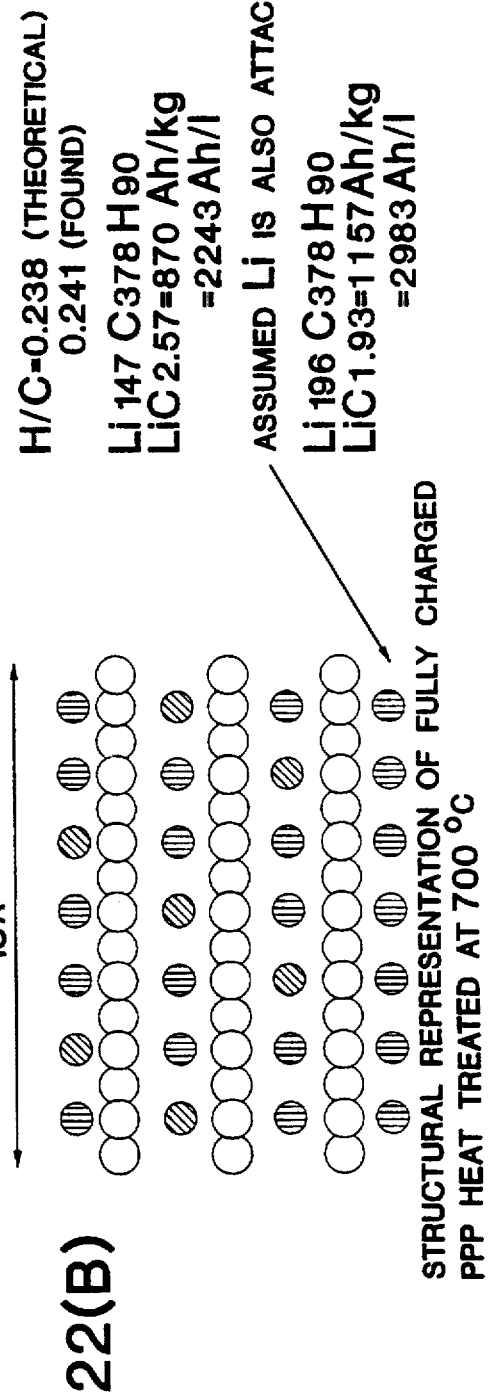

The results shown in FIG. 21 revealed that the carbon material has two sites [site (A) and site (B)] which lithium can occupy when lithium is absorbed. From the results of NMR spectrum analysis shown in FIG. 21 and X-ray diffraction, schematic structural representations of a crystal of the alkali metal-absorbed carbon material obtained from the 700° C. heat-treated material are shown in FIG. 22. FIG. 22(A) is a plan view and FIG. 22(B) is a cross sectional view thereof.

As apparent from FIG. 22(A), in the conventional lithium intercalation compounds, the limitation has been considered to be LiC$_6$, and one peripheral line can not be used to form a diamond-shaped structure, if a lithium ion (ion Li) enters a benzene ring of the carbon material. The lithium ion absorbed is therefore governed by carbon skeleton, and it is not permitted that only one ion moves to the neighborhood, resulting in solid-like behavior and lattice formation. Thus, peak (A) has a Gaussian line shape.

In contrast, site (B) is occupied by a covalent lithium molecule (covalent Li), is Lorenzian, shows liquid-like behavior, and has no fixed position.

The mechanism of discharge is considered as follows. Li already ionized [ion Li, site (A)] is discharged to form a vacant seat. On the other hand, the covalent lithium molecule [covalent Li, site (B)] can not be discharged immediately, but it becomes a lithium reservoir and migrates to the above-mentioned vacant seat portion, from which it is discharged. Accordingly, the discharge capacity exceeding LiC$_6$ becomes possible. For example, an alkali ion absorbing/desorbing carbon material such as LiC$_{1.93}$ becomes available.

Thus, deduction from FIG. 22 requires a coronene (hexabenzobenzene) structure, as a minimum unit of the carbon material in which the ion site and the covalent site can coexist.

What is claimed is:

1. A carbon material capable of absorbing and desorbing covalent lithium ions, comprising a poly(phenylene) heat treated at a temperature of 300° to 1000° C., wherein 1 to 20 mol % of monomers of said poly(phenylene) are linked together by o-bonding or m-bonding, and wherein said carbon material has a hydrogen/carbon atomic ratio of 0.15 to 0.6 and has a randomly stacked, condensed aromatic ring structure.

2. The carbon material according to claim 1, wherein said poly(phenylene) has an X-ray diffraction peak in the vicinity of 2θ=20° having a half-width of 0.75° or more, a melting point of at least 700° C. under heat treatment conditions, and wherein the amount of carbon material present after heat treatment of said poly(phenylene) is 40%, based on the amount of poly(phenylene) present prior to said heat treatment.

3. The carbon material according to claim 1, having a Fractal dimension D, defined by the equation $$D = N + \log E_D / \log (1/r)$$

wherein r represents a measure ratio, N represents the dimensions, and E$_D$ represents an increase in distance when the measure ratio is changed, wherein said Fractal dimension D satisfies the relation $$1.7 \leq D < 2.0.$$

4. The carbon material according to claim 1, having a randomly stacked, condensed aromatic ring structure; wherein when said carbon material has adsorbed an alkali metal ion, said carbon material has an A/C atomic ratio, wherein A represents an alkali metal element and C represents carbon, in the range of 0.125 to 1, and yields an NMR spectrum of an alkali atomic nucleus having a chemical shift δ comprising a first peak at 0±2 ppm, and a second peak on the plus side of said first peak, when a peak of a 1 mol/liter aqueous solution of ACl was taken as 0 ppm.

5. The carbon material according to claim 1, wherein said poly(pheenylene) contains quinoid structures.

6. The carbon material according to claim 1, wherein said poly(phenylene) has a degree of polymerization R of 2 or more, wherein R is determined by the equation $$R=A[\delta(para)]/\{A[\delta(mono1)]+A[\delta(mono2)]\}$$

wherein $A[\delta(para)]$ represents the absorbance of an absorption band of an out-of-plane deformation vibration mode of C—H in the vicinity of 804 $cm^{-1}$ in an infrared absorption spectrum, and $A[\delta(mono1)]$ and $A[\delta(mono2)]$ represent the absorbance of absorption bands of the terminal phenyl groups in the vicinity of 760 $cm^{-1}$ and 690 $cm^{-1}$, respectively.

7. An electrode material for a secondary battery comprising the carbon material according to claim 1.

8. A lithium secondary battery comprising an anode and a lithium-containing electrolyte, wherein said anode comprises the carbon material according to claim 1.

9. An anode comprising the electrode material according to claim 8, having a charge capacity exceeding 372 Ah/kg.

10. The carbon material according to claim 1, wherein said carbon material has a hydrogen/carbon atomic ratio of 0.05 to 0.6.

11. The carbon material according to claim 1, wherein said poly(phenylene) is heat treated at a temperature of 600° to 800° C.

12. The carbon material according to claim 1, wherein 2 to 10 mol % of the monomers of said poly(phenylene) are linked together by o-bonding or m-bonding.

13. A carbon material capable of absorbing and desorbing alkali metal ions, comprising a poly(phenylene) heat treated at a temperature of 300° to 1000° C., wherein 1 to 20 mol % of the monomers of said aromatic polymer are linked together by o-bonding or m-bonding, and wherein said carbon material has a randomly stacked, condensed structure.

14. A carbon material, having a hydrogen/carbon atomic ratio of 0.15 to 0.6, capable of absorbing and desorbing covalent lithium ions, and comprising a poly(phenylene) heat treated at a temperature of 600° to 800° C., wherein said poly(phenylene) comprises monomers that are linked together by o-bonding or m-bonding and said carbon material has a randomly stacked, condensed aromatic ring structure.

15. The carbon material according to claim 14, wherein said poly(phenylene) has an X-ray diffraction peak in the vicinity of 2θ=20° C. having a half-width of 0.75° or more, a melting point of at least 700° C. under heat treatment conditions, and wherein the amount of carbon material present after heat treatment of said poly(phenylene) is 40%, based on the amount of poly(phenylene) present prior to said heat treatment.

16. The carbon material according to claim 14, having a Fractal dimension D, defined by the equation $$D=N+ \log E_D/ \log (1/r)$$

wherein r represents a measure ratio, N represents the dimensions, and $E_D$ represents an increase in distance when the measure ratio is changed, wherein said Fractal dimension D satisfies the relation $$1.7 \leq D \leq 2.0.$$

17. The carbon material according to claim 14, having a randomly stacked, condensed aromatic ring structure; wherein when said carbon material has absorbed an alkali metal ion, said carbon material has an A/C aromatic ratio, wherein A represents an alkali metal element and C represents carbon, in the range of 0.125 to 1, and yields an NMR spectrum of an alkali atomic nucleus having a chemical shift δ comprising a first peak at 0±2 ppm, and a second peak on the plus side of said first peak, when a peak of a 1 mol/liter aqueous solution of ACl was taken as 0 ppm.

18. The carbon material according to claim 14, wherein said alkali metal ion is at least covalent lithium ion.

19. The carbon material according to claim 14, comprising randomly stacked coronene in sufficient amount to allow the carbon material to absorb lithium.

20. The carbon material according to claim 14, wherein said poly(phenylene) contains quinoid structures.

21. The carbon material according to claim 14, wherein said poly(phenylene) has a degree of polymerization R of 2 or more, wherein R is determined by the equation $$R=A[\delta(para)]/\{A[\delta(mono1)]+A[\delta(mono2)]\}$$

wherein $A[\delta(para)]$ represents the absorbance of an absorption band of an out-of-plane deformation vibration mode of C—H in the vicinity of 804 $cm^{-1}$ in an infrared absorption spectrum, and $A[\delta(mono1)]$ and $A[\delta(mono2)]$ represent the absorbance of absorption bands of the terminal phenyl groups in the vicinity of 760 $cm^{-1}$ and 690 $cm^{-1}$, respectively.

22. The carbon material according to claim 14, wherein said poly(phenylene) comprises 1 to 20 mol % monomers that are linked together by o-bonding or m-bonding.

23. The carbon material according to claim 22, wherein 2 to 10 mol % of said monomers are linked together by o-bonding or m-bonding.

24. The carbon material according to claim 14, wherein said poly(phenylene) is obtained by the Kovacic method.

25. An electrode material for a secondary battery comprising the carbon material according to claim 14.

26. A lithium secondary battery comprising an anode and the carbon material according to claim 14.

27. An anode comprising the electrode material according to claim 25, having a charge capacity exceeding 372 Ah/Kg.

* * * * *